(12) United States Patent
Takeda et al.

(10) Patent No.: US 9,839,064 B2
(45) Date of Patent: Dec. 5, 2017

(54) SENSOR DATA COLLECTING DEVICE

(71) Applicant: Kabushiki Kaisha Toshiba, Minato-ku, Tokyo (JP)

(72) Inventors: Akira Takeda, Kawasaki Kanagawa (JP); Takeshi Kodaka, Kamakura Kanagawa (JP); Akira Yokosawa, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 150 days.

(21) Appl. No.: 14/840,511

(22) Filed: Aug. 31, 2015

(65) Prior Publication Data

US 2016/0302255 A1 Oct. 13, 2016

(30) Foreign Application Priority Data

Apr. 10, 2015 (JP) ................. 2015-081203

(51) Int. Cl.
H04W 76/04 (2009.01)
H04W 4/00 (2009.01)
H04W 76/06 (2009.01)

(52) U.S. Cl.
CPC ......... *H04W 76/046* (2013.01); *H04W 4/005* (2013.01); *H04W 76/068* (2013.01)

(58) Field of Classification Search
CPC . H04W 4/005; H04W 76/068; H04W 76/046; H04W 4/00; H04W 76/04
See application file for complete search history.

(56) References Cited

U.S. PATENT DOCUMENTS 5,894,577 A * 4/1999 MacDonald .......... G06F 1/3215
710/260
2004/0218574 A1* 11/2004 Sata ....................... H04W 12/06
370/338
2009/0216349 A1* 8/2009 Kwon ............... H04W 52/0219
700/33

FOREIGN PATENT DOCUMENTS

| JP | 2000-259429 A | | 9/2000 |
| JP | 2002-182930 A | | 9/2000 |
| JP | 2000259429 A | * | 9/2000 |
| JP | 2002-182930 A | | 6/2002 |
| JP | 2011-186591 A | | 9/2011 |
| JP | 2011186591 A | * | 9/2011 |

* cited by examiner

*Primary Examiner* — Charles C Jiang
*Assistant Examiner* — Kyaw Z Soe
(74) *Attorney, Agent, or Firm* — White & Case LLP

(57) ABSTRACT

A sensor data collecting device includes a first circuit and a controller. The controller has a first state and a second state and acquires data of one or a plurality of sensors in the second state. The first circuit includes a first register and causes the controller to transit from the first state to the second state. The controller sets the first register based on a minimal data generation period among data generation periods.

18 Claims, 34 Drawing Sheets

FIG.2

| ID | ENTRY ADDRESS (entry address) | PROCESSING INTERVAL (interval) |
|---|---|---|
| 0 | 0x1100 | 80 |
| 1 | 0x1200 | 100 |
| 2 | 0x1300 | 125 |

41a — ENTRY ADDRESS column
41b — PROCESSING INTERVAL column

| ID | ENTRY ADDRESS (entry address) 42a | PROCESSING INTERVAL (interval) 42b | NEXT PROCESSING TIME (next_proc) 42c |
|---|---|---|---|
| 0 | 0x1100 | 80 | 80 |
| 1 | 0x1200 | 100 | 100 |
| 2 | 0x1300 | 125 | 125 |

| ID | ENTRY ADDRESS (entry address) | PROCESSING INTERVAL (interval) | NEXT PROCESSING TIME (next_proc) | TRIGGER TYPE (trigger type) |
|---|---|---|---|---|
| 0 | 0x1100 | 80 | 80 | int |
| 1 | 0x1200 | 100 | 100 | timer |
| 2 | 0x1300 | 125 | 125 | int |

| ID | ENTRY ADDRESS (entry address) 44a (45a) | PROCESSING INTERVAL (interval) 44b (45b) | NEXT PROCESSING TIME (next_proc) 44c (45c) | DATA LIFETIME (lifetime) 44e (45e) | NEXT DEADLINE (next_deadline) 44f (45f) |
|---|---|---|---|---|---|
| 0 | 0x1100 | 80 | 80 | 80 | 160 |
| 1 | 0x1200 | 100 | 100 | 25 | 125 |
| 2 | 0x1300 | 125 | 125 | 125 | 250 |

| ID | ENTRY ADDRESS (entry address) 46a | PROCESSING INTERVAL (interval) 46b | NEXT PROCESSING TIME (next_proc) 46c | TRIGGER TYPE (trigger type) 46d | DATA LIFETIME (lifetime) 46e | NEXT DEADLINE (next_deadline) 46f |
|---|---|---|---|---|---|---|
| 0 | 0x1100 | 80 | 80 | int | 80 | 160 |
| 1 | 0x1200 | 100 | 100 | timer | 25 | 125 |
| 2 | 0x1300 | 125 | 125 | int | 125 | 250 |

SENSOR DATA COLLECTING DEVICE

CROSS-REFERENCE TO RELATED APPLICATIONS

This application is based upon and claims the benefit of priority from Japanese Patent Application No. 2015-081203, filed on Apr. 10, 2015; the entire contents of which are incorporated herein by reference.

FIELD

Embodiments described herein relate generally to a sensor data collecting device that is connectable to a plurality of sensors.

BACKGROUND

In a processor system executing acquisition of data of a plurality of sensors, in order to reduce power consumption, a processor is in a sleep state when the acquisition of data is not executed.

In such a processor system, in a case where data generation periods of the plurality of sensors are different from each other, there is a technique of causing the processor to transit from the sleep state to an active state when data of each sensor can be acquired. According to such a technique, the state transition of the processor frequently occurs, and power consumption according to the state transition increases.

BRIEF DESCRIPTION OF THE DRAWINGS

FIG. 2 is a diagram that illustrates a management table according to the first embodiment;

DETAILED DESCRIPTION

In general, according to one embodiment, a sensor data collecting device is connectable to a plurality of sensors. The plurality of sensors generate sensed data at a plurality of different data generation periods. The sensor data collecting device includes a first circuit and a controller. The controller has a first state and a second state and acquires data of one or a plurality of sensors in the second state. The first circuit includes a first register and causes the controller to transit from the first state to the second state based on a register value of the first register. The controller sets the first register based on a minimal data generation period among the plurality of data generation periods.

Exemplary embodiments of a sensor data collecting device will be explained below in detail with reference to the accompanying drawings. The present invention is not limited to the following embodiments.

First Embodiment

Figure 1:
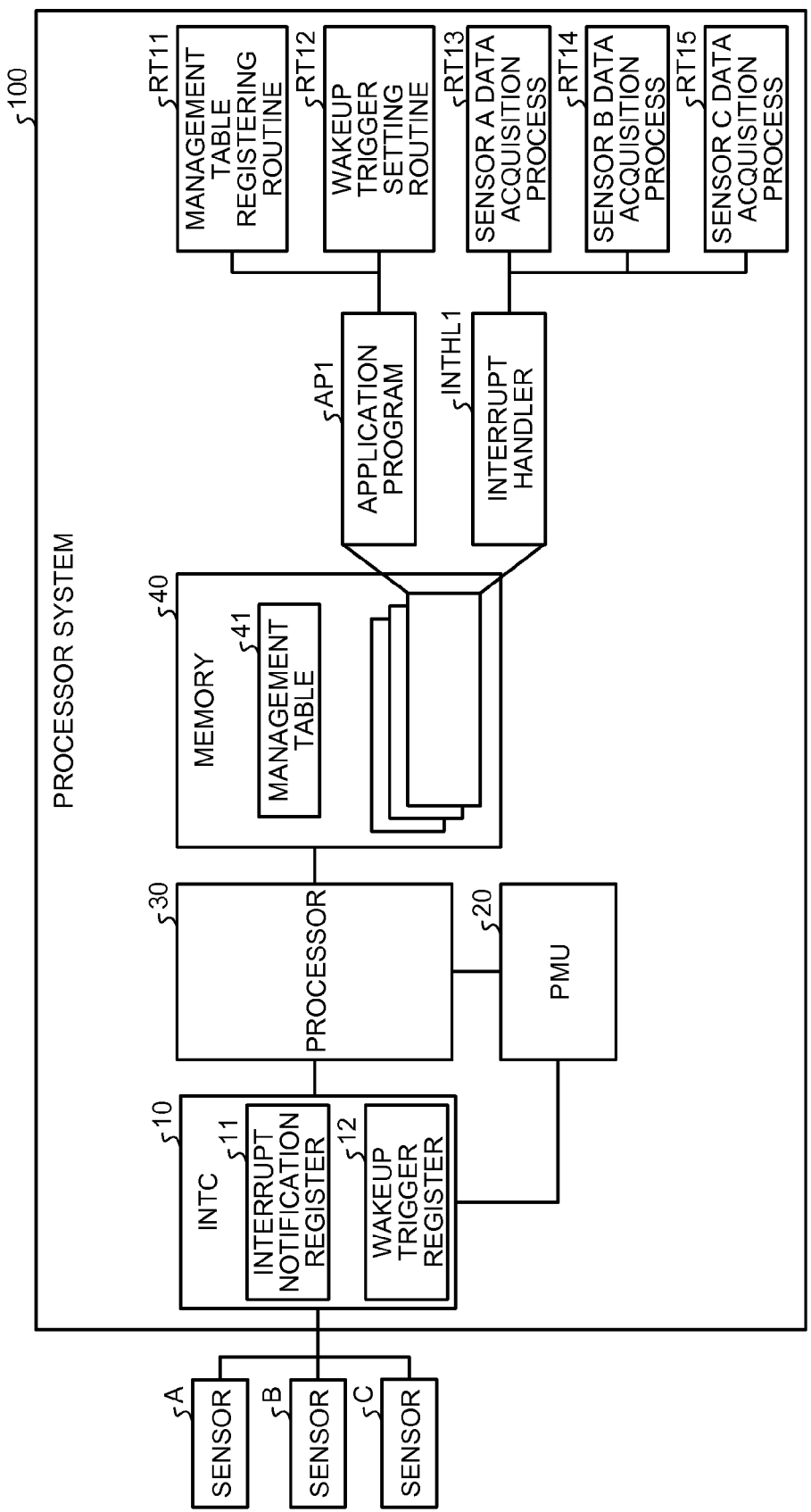
FIG. 1 is a block diagram that illustrates a processor system according to a first embodiment.

FIG. 1 is a functional block diagram that illustrates a processor system 100 as a sensor data collecting device according to a first embodiment. The processor system 100 is connectable to a plurality of sensors A to C. In the case illustrated in FIG. 1, while three sensors are illustrated, the number of sensors may be an arbitrary number of two or more. The processor system 100 collects data detected by the sensors A to C. The processor system 100 includes: an interrupt controller (hereinafter, referred to as an INTC) 10; a power management unit (hereinafter, referred to as a PMU) 20; a processor 30; and a memory 40. The processor 30 configures a controller of a sensor data collecting device.

The processor 30 executes a plurality of programs loaded into the memory 40. When an interrupt request is received from the INTC 10, the processor 30 executes an interrupt handler INTHL1 that is software used for processing an interrupt. The processor 30 has two operation states. A first operation state has low power consumption and is a sleep state in which the process relating to the acquisition of sensor data is not executed. A second operation state has power consumption higher than that of the sleep state and is an active state in which the process relating to acquisition of sensor data is executed. A predetermined time is required for a transition between the active state and the sleep state. During the transition, power (that is the same as that of the active state or higher) higher than that of the sleep state is consumed. A certain amount of power is consumed during the transition. It is higher than that of the sleep state and can be the same as that of the active state or higher. Here, a transition of the processor 30 from the sleep state to the active state will be referred to as "wakeup".

Each of the sensors A to C executes a sensing operation at a predetermined period by an application program AP1. When sensed sensor data can be acquired by the processor system 100, each of the sensors A to C issues an interrupt request to the INTC 10. In other words, each of the sensors A to C generates sensed data at a predetermined data generation period and issues an interrupt request to the INTC 10 when the data is generated. The data generation periods of the sensors A to C are different from each other. Sensor IDs that are individually identifiable are assigned to the sensors A to C. Here, the ID of the sensor A is set to "0", the ID of the sensor B is set to "1", and the ID of the sensor C is set to "2".

The PMU 20 manages the supply of power to the INTC 10, the processor 30, the memory 40, and the like. The PMU 20 wakes the processor 30 up according to a request from the INTC 10.

The INTC 10 includes an interrupt notification register 11 and a wakeup trigger register 12. The interrupt notification register 11 stores information representing the presence/no-presence of interrupt requests from the sensors A to C. The interrupt notification register 11 includes an entry for each sensor ID, and, in each entry, an interrupt flag representing presence/no-presence of an interrupt request from a sensor corresponding to the sensor ID is recorded. In the interrupt flag, "1" represents assert, and "0" represents negate. Hereinafter, it is assumed that register values of the interrupt notification register 11 represent interrupt flags in order of the sensors A, B, and C from the left side. Thus, "(000)" represents a state in which no interrupt request is generated from the sensors A to C. In addition, "(100)" represents a state in which an interrupt request is generated from the sensor A. "(101)" represents a state in which interrupt request are generated from the sensors A and C. When an interrupt request is received, The INTC 10 updates the corresponding entry. During a period in which at least one entry is "1", the INTC 10 notifies the processor 30 of the interrupt request by using a level signal. After the execution of the process of acquiring sensor data, the processor 30 clears the entry of a corresponding sensor ID from "1" to "0".

The wakeup trigger register 12 stores information used for identifying a sensor to be triggered for waking up the processor 30. The wakeup trigger register 12 has an entry for each sensor ID. In each entry, a wakeup trigger flag is recorded. The wakeup trigger flag is a flag used for instructing the PMU 20 whether or not to notify the processor 30 of a wakeup request when an interrupt request is received from a sensor corresponding to the sensor ID. Hereinafter, it is assumed that the register values of the wakeup trigger register 12 represent wakeup trigger flags in order of the sensors A, B, and C from the left side. "(100)" represents that the PMU 20 is instructed to transmit a wakeup request only when an interrupt request is received from the sensor A. In addition, "(010)" represents that the PMU 20 is instructed to transmit a wakeup request only when an interrupt request is received from the sensor B. "(001)" represents that the PMU 20 is instructed to transmit a wakeup request only when an interrupt request is received from the sensor C. The setting of the wakeup trigger register 12 is executed by the processor 30.

In the memory 40, a management table 41 and a plurality of programs executed by the processor 30 are stored. An application program AP1 is a program operated at the time of starting up the processor system 100 and executes initial setting for the acquisition of sensor data. A management table registering routine RT11 is a program that is operated by being called by the application program AP1 and executes the process of registering the management information in the management table 41. A wakeup trigger setting routine RT12 is a program that is operated by being called by the application program AP1 and executes a setting process of the wakeup trigger register 12. When the processor 30 transits from the sleep state to the active state, the interrupt handler INTHL1 starts to operate and executes a sensor A data acquisition process RT13, a sensor B data acquisition process RT14, or a sensor C data acquisition process RT15, thereby executing a data acquisition processes for the sensors A to C. The sensor A data acquisition process RT13 is a program having a function of acquiring data of the sensor A and storing the acquired data in a predetermined data storage area inside the memory 40. The sensor B data acquisition process RT14 is a program having a function of acquiring data of the sensor B and storing the acquired data in a predetermined data storage area inside the memory 40. The sensor C data acquisition process RT15 is a program having a function of acquiring data of the sensor C and storing the acquired data in a predetermined data storage area inside the memory 40.

FIG. 2 is a diagram that illustrates the data structure of the management table 41. The management table 41 includes management information having a set of a sensor ID, an entry address 41a of the data acquisition process, and a processing interval 41b. The entry address 41a represents a physical address of the memory 40 where the sensor data acquisition processes RT13 to RT15 corresponding to the sensor ID are stored. The processing interval 41b represents a data generation period of each of the sensors A to C. The processor 30 executes the process of setting the management table 41 at the time of starting up the processor system 100.

Hereinafter, the process according to the first embodiment of a case where three sensors A, B, and C are connected to the processor system 100 will be described. Here, as illustrated in FIG. 2, the sensor A generates sensed data at an interval of 80 msec. The processor 30 acquires data of the sensor A by executing the data acquisition process RT13 (entry address 0x1100). Similarly, the sensor B generates sensed data at an interval of 100 msec. The processor 30 acquires data of the sensor A by executing the data acquisition process RT14 (entry address 0x1200). The sensor C generates sensed data at an interval of 125 msec. The processor 30 acquires data of the sensor C by executing the data acquisition process RT15 (entry address 0x1300).

Figure 3A:
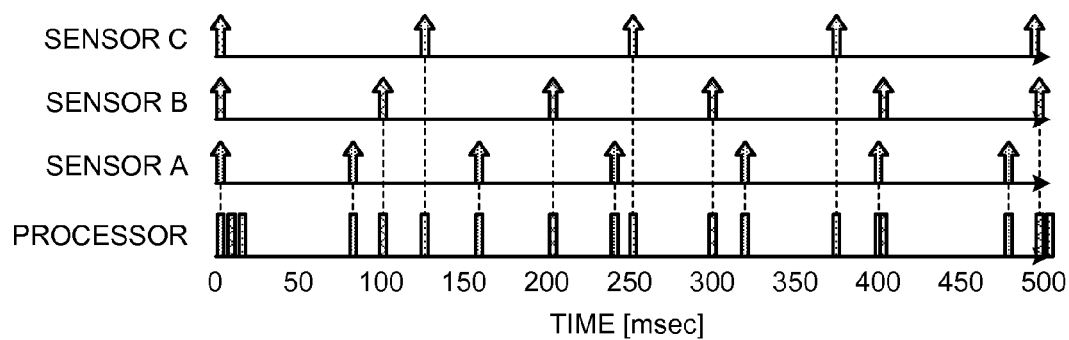
FIG. 3A is a timing diagram that illustrates the operations of a sensor and a processor of a comparative example.
Figure 3B:
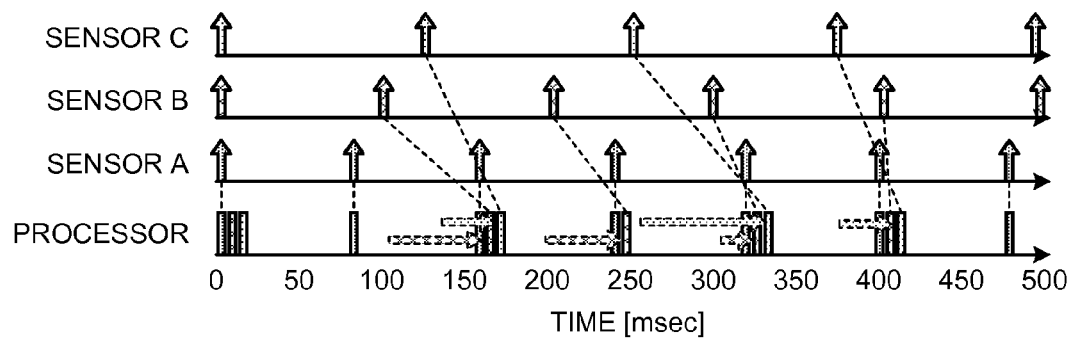
FIG. 3B is a timing diagram that illustrates the operations of a sensor and a processor according to first to third embodiments.

FIGS. 3A and 3B are timing diagrams that illustrate the sensor data acquisition processes. FIG. 3A illustrates a comparative example, and FIG. 3B illustrates the first embodiment. Each arrow represents timing at which sensor data is generated. The data acquisition period is at an interval of 80 msec for the sensor A, is at an interval of 100 msec for the sensor B, and is at an interval of 125 msec for the sensor C. In the comparative example, each time the acquisition period of one of the sensors A to C arrives, the processor 30 is woken up, data of a corresponding sensor is acquired, and then, the processor 30 enters the sleep state. For this reason, in the comparative example, from time 0 to time 500, the processor 30 is woken up 14 times. According to the first embodiment, the processor 30 is woken up at the minimum data acquisition interval (the acquisition interval of the sensor A). Thus, according to the first embodiment, from time 0 to time 500, the processor 30 is woken up seven times. As above, according to the first embodiment, it is possible to decrease the number of state transitions (the number of wake-ups) to be less than that of the comparative example.

Figure 4:
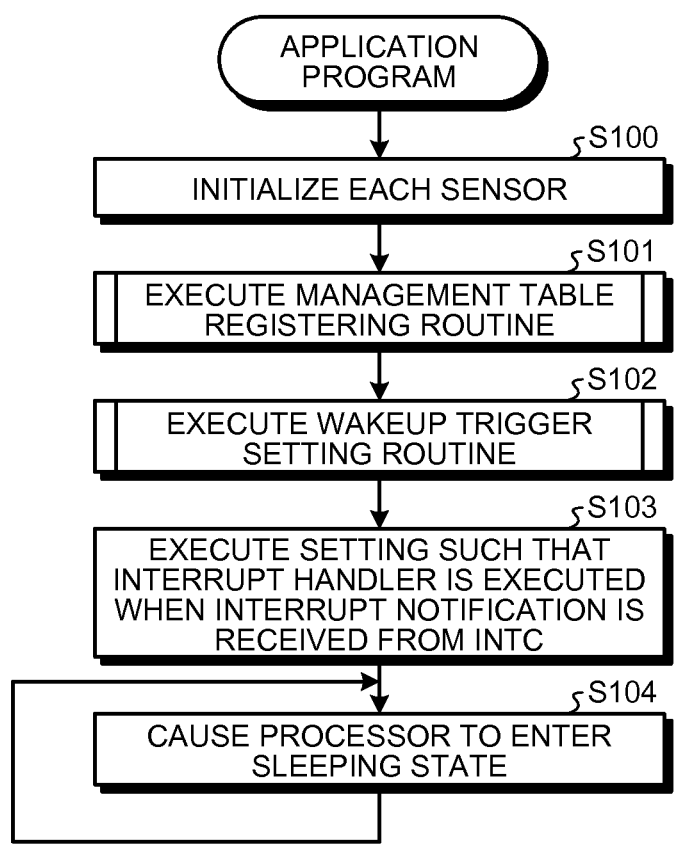
FIG. 4 is a flowchart that illustrates the operation sequence of an application program according to the first embodiment.

Hereinafter, the operation according to the first embodiment will be described in detail. FIG. 4 is a flowchart that illustrates the operation sequence of the application program AP1. When the processor system 100 is started up, the processor 30 executes the application program AP1. The application program AP1 initializes the sensors A, B, and C (S100).

Figure 5:
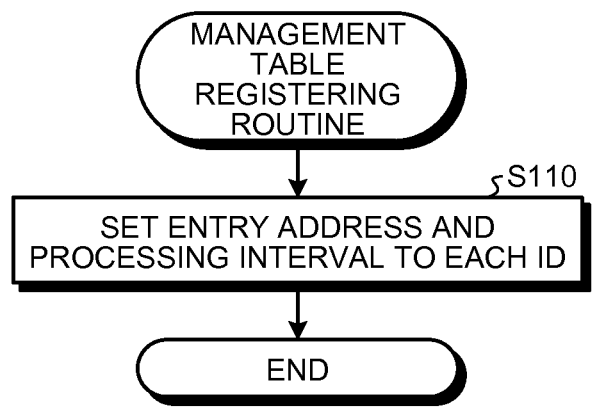
FIG. 5 is a flowchart that illustrates a management table registering routine according to the first embodiment.

Next, the processor 30 executes the management table registering routine RT11 (S101). FIG. 5 is a flowchart that illustrates the management table registering routine RT11. First, ID=0, entry address=0x1100, and interval=80 are passed as arguments, and the management table registering routine RT11 is executed. Accordingly, the management information of the sensor A is registered in the management table 41. Similarly, the management information of the sensor B and the sensor C is registered in the management table 41 (FIG. 5: S110). Accordingly, the management table 41 is formed as illustrated in FIG. 2.

Figure 6:
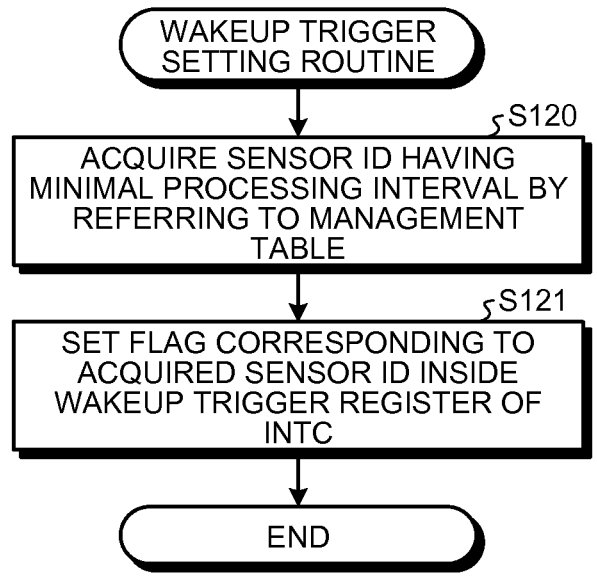
FIG. 6 is a flowchart that illustrates a wakeup trigger setting routine according to the first embodiment.

Next, the processor 30 executes the wakeup trigger setting routine RT12 (FIG. 4: S102). FIG. 6 is a flowchart that illustrates the wakeup trigger setting routine RT12. The processor 30 acquires a sensor ID having a minimal processing interval from the management table 41 (S120). In this case, the sensor ID having the minimal processing interval is the sensor A (ID=0). The processor 30 sets the wakeup trigger register 12 such that a processor wakeup request is issued from the INTC 10 only when an interrupt processing request from the sensor having the acquired ID is issued (S121). In other words, the processor 30 sets the wakeup trigger flag of the acquired sensor ID to "1". In this case, the wakeup trigger register 12 becomes (100).

Next, the processor 30 sets an interrupt vector and the like such that the interrupt handler INTHL1 is executed when an interrupt request is received from the INTC 10 (FIG. 4: S103). Thereafter, the application program AP1 causes the processor 30 to enter the sleep state (S104).

Figure 7:
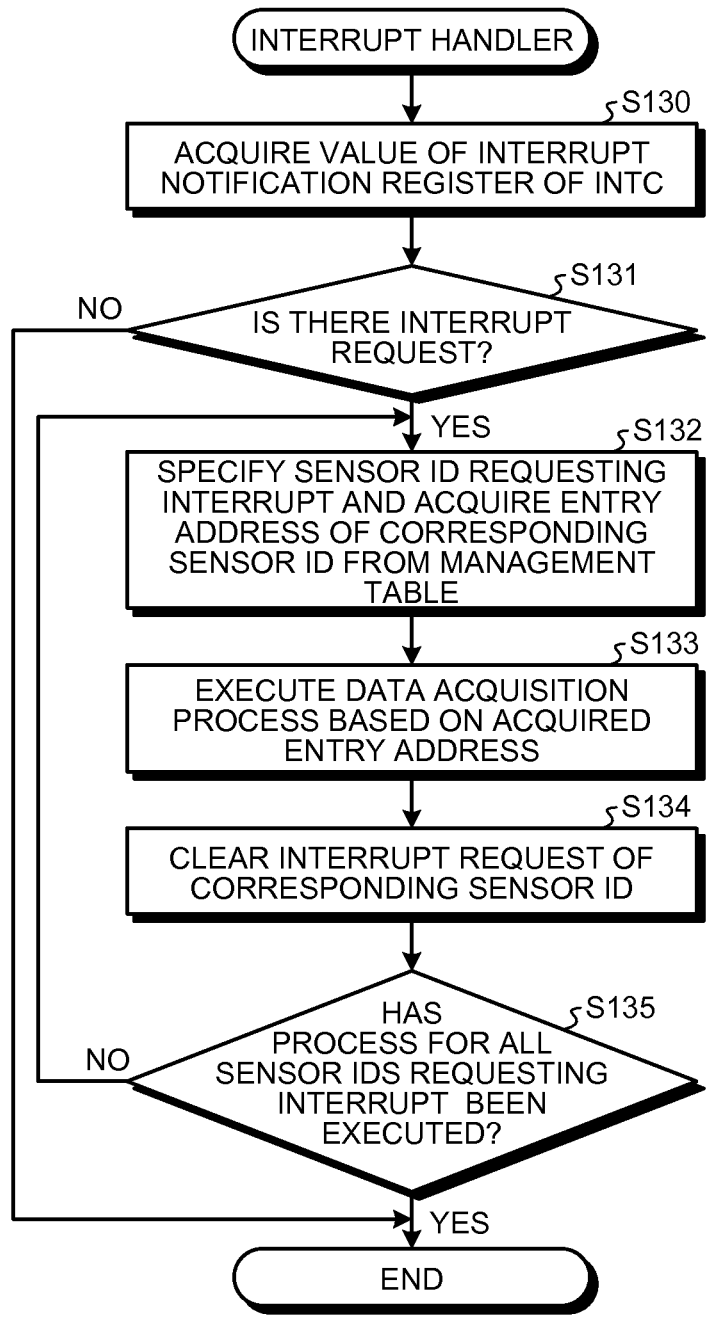
FIG. 7 is a flowchart that illustrates the operation sequence of an interrupt handler according to the first embodiment.

FIG. 7 is a flowchart that illustrates the operation sequence of the interrupt handler INTHL1. The interrupt handler INTHL1 is software that is executed when the processor 30 is notified of an interrupt request. The interrupt handler INTHL1 checks whether or not an interrupt request from the sensor has occurred by referring to the interrupt notification register 11 (S131). In a case where there is an interrupt request (Yes: S131), the interrupt handler INTHL1 acquires an entry address 41a corresponding to the sensor ID requesting the interrupt from the management table 41 (S132) and executes a data acquisition process stored in the acquired entry address (S133). When the data acquisition process ends, the interrupt handler INTHL1 clears the interrupt flag of the corresponding sensor ID from "1" to "0" (S134). The interrupt handler INTHL1 determines whether or not the data acquisition process has been executed for all the sensor IDs of which the interrupt flags are "1" (S135). In a case where a result of the determination is "No", the process is returned to S132, and a similar process is executed for the sensor ID of which the interrupt flag is "1".

Next, the operation of the processor system 100 will be described in detail by referring to the timing diagram illustrated in FIG. 3B and the like. When the sensing start time is time 0, during the sensing operation, the following operation is executed. At time 0, the sensors A, B, and C execute sensing operations, and data is generated by each of the sensors A, B, and C. Each of the sensors A to C issues an interrupt request to the INTC 10. Accordingly, the INTC 10 sets the interrupt notification register 11 to "(111)". Since any one of the interrupt flags is "1", the INTC 10 issues an interrupt notification to the processor 30 by using a level signal. In addition, the INTC 10 compares the register value "(111)" of the interrupt notification register 11 with the register value "(100)" of the wakeup trigger register 12 and checks whether or not a bit having a value of "1" in the wakeup trigger register 12 has a value of "1" in the interrupt notification register 11. A result of the determination is "Yes" in this case, and the INTC 10 requests the PMU 20 to wake the processor 30 up. When the processor wakeup request is received from the INTC 10, the PMU 20 causes the processor 30 to transit from the sleep state to the active state.

In this way, the processor 30 wakes up. At this time, since the interrupt notification has been issued from the INTC 10, the processor 30 executes the interrupt handler INTHL1. The interrupt handler INTHL1 acquires the register value "(111)" of the interrupt notification register 11 (FIG. 7: S130). Since there is a bit of "1" in the register value of the interrupt notification register 11, the interrupt handler INTHL1 executes the data acquisition process. First, the interrupt handler INTHL1 specifies a sensor ID having an interrupt request based on the bit position. In this case, first, ID=0 is selected. The interrupt handler INTHL1 acquires the entry address "0x1100" of the ID=0 from the management table 41 (FIG. 7: S132) and executes the sensor A data acquisition process RT13 stored at the entry address "0x1100" of the memory 40 (FIG. 7: S133). Next, the interrupt handler INTHL1 clears the interrupt flag of the ID=0 to "0" (FIG. 7: S134). Similarly, ID=1 is specified, and the sensor B data acquisition process RT14 is executed. In addition, ID=2 is specified, and the sensor C data acquisition process RT15 is executed. Then, since the processes for all the requested sensor IDs have been executed, the process of the interrupt handler INTHL1 ends, and the process is returned to the application program AP1. The application program AP1 causes the processor 30 to enter the sleep state.

Next, at time 80, an interrupt request is issued from the sensor A. At this time, a register value of "(100)" is stored in the interrupt notification register 11. The INTC 10 checks whether or not a bit having a value of "1" in the wakeup trigger register 12 is "1" in the interrupt notification register 11. In this case, a result of the determination is "Yes". For this reason, the processor 30 is woken up by the PMU 20, and the sensor A data acquisition process is executed by the interrupt handler INTHL1.

Next, at time 100, an interrupt request is issued from the sensor B. At this time, a value of the interrupt notification register 11 is "(010)". However, since a bit of the ID=1 corresponding to the sensor B is not "1" in both registers 11 and 12, the INTC 10 does not issue a processor wakeup request to the PMU 20. For this reason, the processor 30 remains in the sleep state, and the sensor B data acquisition process is not executed.

Next, at time 125, an interrupt request is issued from the sensor C. At this time, a value of the interrupt notification register 11 is "(011)". However, since a bit of the ID=1 corresponding to the sensor B and a bit of the ID=2 corresponding to the sensor C are not "1" in both the registers 11 and 12, the INTC 10 does not issue a processor wakeup request to the PMU 20. For this reason, the processor 30 remains in the sleep state, and the sensor B data acquisition process and the sensor C data acquisition process are not executed.

Next, at time 160, an interrupt request is issued from the sensor A. At this time, a value of the interrupt notification register 11 is "(111)". Since a bit of the ID=0 corresponding to the sensor A is "1" in both the registers 11 and 12, the INTC 10 issues a wakeup request of the processor 30 to the PMU 20. When the processor wakeup request is received from the INTC 10, the PMU 20 wakes the processor 30 up. Accordingly, the interrupt handler INTHL1 is executed, and the data acquisition processes for the sensors A, B, and C are executed. Thereafter, the processor 30 enters the sleep state.

Thereafter, similarly, the processor 30 wakes up only at time 240, time 320, time 400, and time 480, and a data acquisition processes for one or a plurality of sensors that have made interrupt requests until that time are executed at once.

As above, in the first embodiment, the processor 30 is woken up based on a minimal data acquisition interval among a plurality of data acquisition intervals, and the number of times of executing a transition between the sleep state and the active state of the processor 30 can be reduced. For this reason, the power consumption of the processor 30 can be reduced. In addition, the sensor data is not overwritten before the acquisition of the sensor data in the processor 30, and accordingly, the sensor data is not lost.

Second Embodiment

According to the first embodiment, each of the sensors A to C issues an interrupt request at the time of generation of data. However, an interrupt request may not be issued depending on the sensor. In a second embodiment, a case is considered in which not all the sensors A to C have an interrupt request function.

Figure 8:
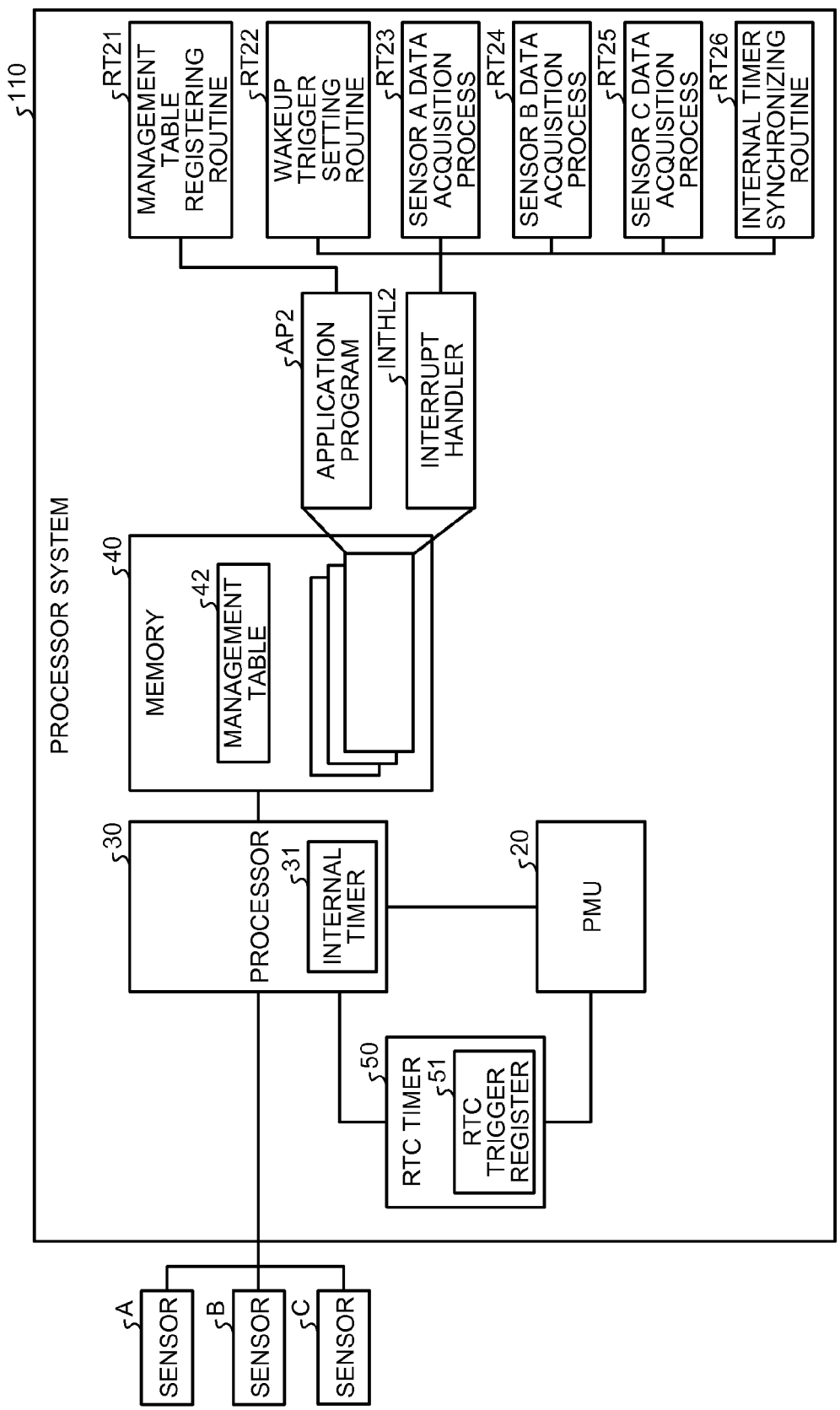
FIG. 8 is a block diagram that illustrates a processor system according to a second embodiment.

FIG. 8 is a functional block that illustrates a processor system 110 according to the second embodiment. The processor system 110 is connected to sensors A to C. In the case illustrated in FIG. 8, the INTC 10 illustrated in FIG. 1 is replaced with a real-time clock timer (hereinafter, referred to as an RTC timer) 50. The RTC timer 50 includes a counter that counts a time. The RTC timer 50 is continued to operate constantly also in the sleep state of a processor 30. The processor 30 includes an internal timer 31. The internal timer 31 includes a counter that counts a time. The internal timer 31 stops time counting when the processor 30 is in the sleep state.

The RTC timer 50 includes an RTC trigger register 51. The RTC trigger register 51 stores next processing time that is next data generation time of the sensor triggered for waking up the processor 30. The RTC timer 50 has a function of issuing a processor wakeup request to the PMU 20 and notifying the processor 30 of an interrupt request when the counted value coincides with the register value of the RTC trigger register 51. When the processor system 110 is started up, the processor 30 executes the process of setting the RTC trigger register 51. The PMU 20 manages the supply of power to the RTC timer 50, the processor 30, the memory 40, and the like included in the processor system 110. The PMU 20 wakes the processor 30 up according to a request from the RTC timer 50.

In the memory 40, a management table 42 and an application program AP2 and an interrupt handler INTHL2 executed by the processor 30 are stored. The application program AP2 is a program that is operated when the processor system 110 is started up and executes initial setting for the acquisition of sensor data. The management table registering routine RT21 is a program that is operated by being called by the application program AP2 and executes the process of registering management information in the management table 42. When the processor 30 transits from the sleep state to the active state, the interrupt handler INTHL2 is started up and executes a data acquisition process. The wakeup trigger setting routine RT22 is a program that is operated by being called by the interrupt handler INTHL2 and executes the process of setting the RTC trigger register 51. In a sensor A data acquisition process RT23, data of a sensor A is acquired, and the data is stored in a predetermined data storage area inside the memory 40. In a sensor B data acquisition process RT24, data of a sensor B is acquired, and the data is stored in a predetermined data storage area inside the memory 40. In a sensor C data acquisition process RT25, data of a sensor C is acquired, and the data is stored in a predetermined data storage area inside the memory 40. An internal timer synchronizing routine RT26 is a program that is operated by being called by the interrupt handler INTHL2 and executes the process of synchronizing internal timer 31.

Figures 9, 10:
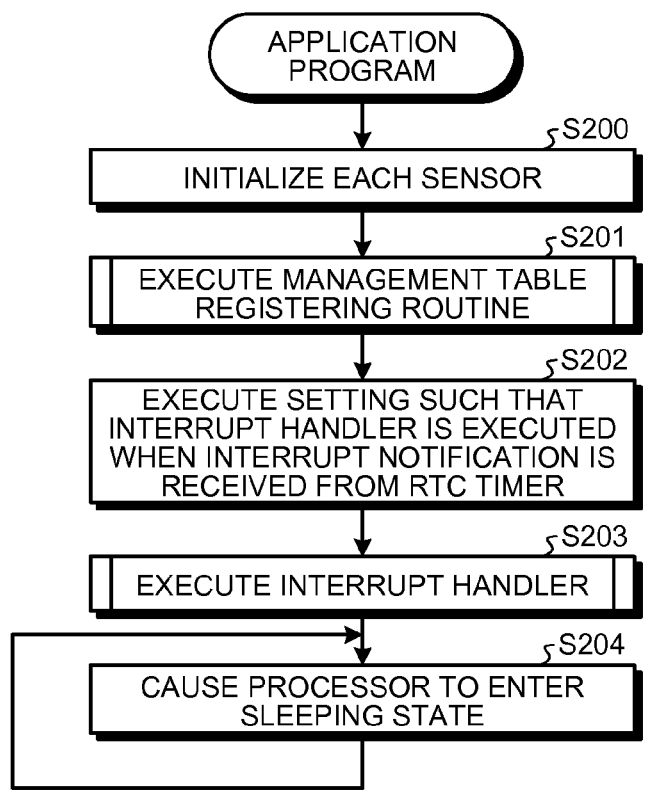
FIG. 9 is a diagram that illustrates a management table according to the second embodiment.
FIG. 10 is a flowchart that illustrates the operation sequence of an application program according to the second embodiment.

FIG. 9 is a diagram that illustrates the data structure of the management table 42. The management table 42 includes management information having a set of a sensor ID and an entry address 42a of a data acquisition process, a processing interval 42b of the sensor data acquisition, and a next processing time (next_proc) 42c. The entry address 42a represents the physical address of the memory 40 where the sensor data acquisition processes RT23 to RT25 for sensor data corresponding to the sensor ID is stored. The processing interval 42b represents a data generation period of each of the sensors A to C. The next processing time (next_proc) 42c represents next data generation time of each of the sensors A to C. The processor 30 executes the process of setting the management table 42 at the time of starting up the processor system 110.

Hereinafter, the operation according to the second embodiment will be described in detail. FIG. 10 is a flowchart that illustrates the operation sequence of the application program AP2. When the processor system 110 is started up, the processor 30 executes the application program AP2. The application program AP2 initializes the sensors A, B, and C (S200).

Figure 11:
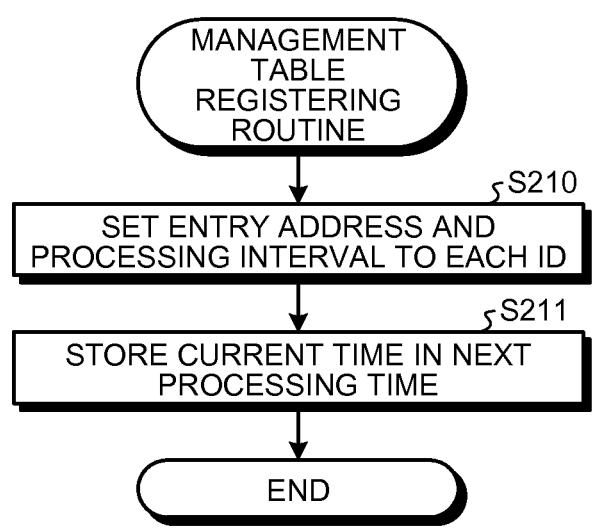
FIG. 11 is a flowchart that illustrates a management table registering routine according to the second embodiment.

Next, the processor 30 executes the management table registering routine RT21 (S201). FIG. 11 is a flowchart that illustrates the management table registering routine RT21. First, ID=0, entry address=0x1100, and interval=80 are passed as arguments, and the management table registering routine RT21 is executed. Accordingly, the management information of the sensor A is registered in the management table 42. Similarly, the management information of the sensor B and the sensor C is registered in the management table 42 (FIG. 11: S210). Next, the processor 30 sets next processing time to the next processing time (next_proc) 42c of each sensor ID. When the management table registering routine RT21 is executed, the processor 30 sets current time (time 0) acquired from the internal timer 31 to the next processing time 42c (S211).

The processor 30 sets an interrupt vector and the like such that the interrupt handler INTHL2 is executed when an interrupt request is received from the RTC timer 50 (FIG. 10: S202). The processor 30 executes the interrupt handler INTHL2 so as to execute a data acquisition process of the first time (S203). Thereafter, the application program AP2 causes the processor 30 to enter the sleep state (S204).

Figure 12:
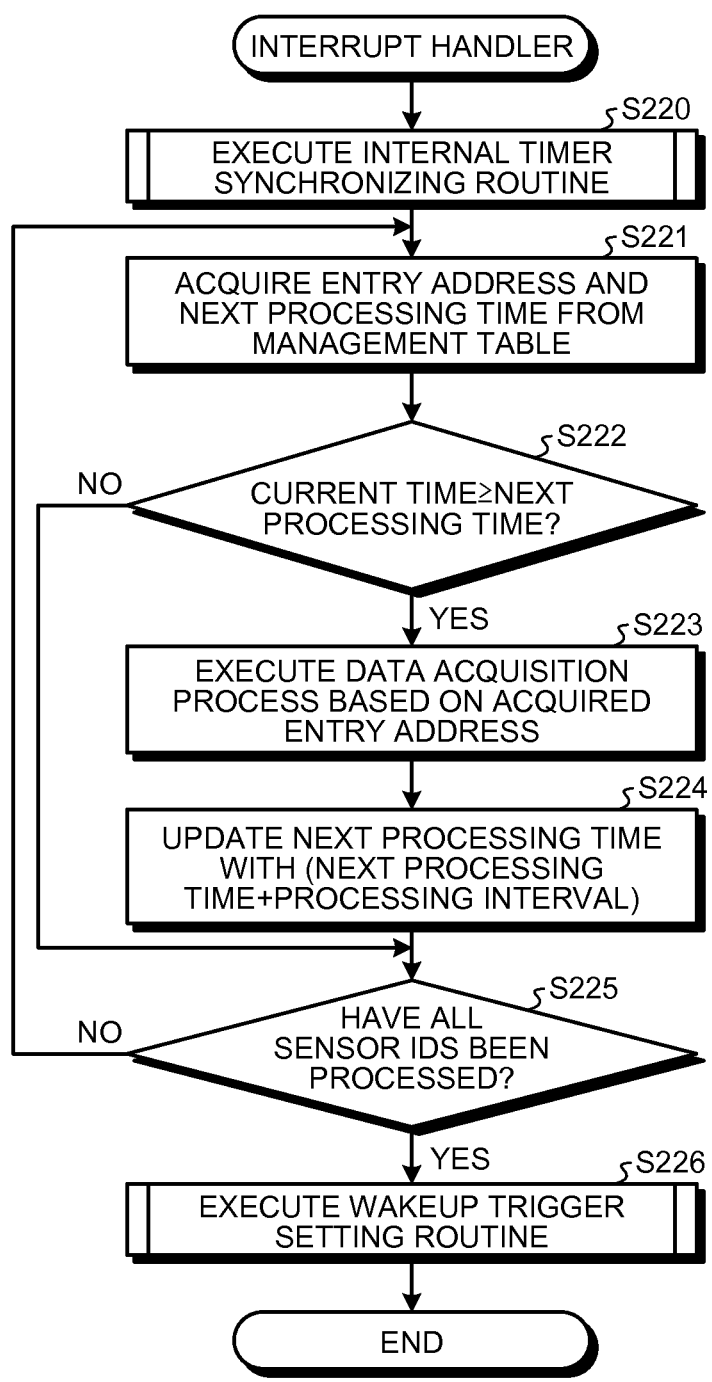
FIG. 12 is a flowchart that illustrates the operation sequence of an interrupt handler according to the second embodiment.
Figure 13:
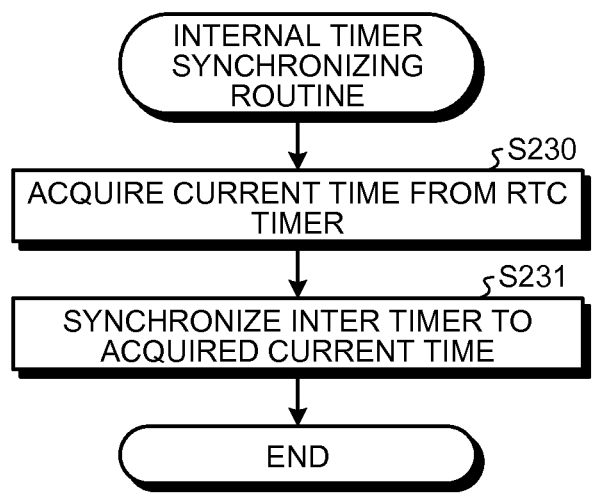
FIG. 13 is a flowchart that illustrates an internal timer synchronizing routine according to second to sixth embodiments.

FIG. 12 is a flowchart that illustrates the operation sequence of the interrupt handler INTHL2. The interrupt handler INTHL2, first, executes the internal timer synchronizing routine RT26 (S220). FIG. 13 is a flowchart that illustrates the internal timer synchronizing routine RT26. The internal timer synchronizing routine RT26 is the process of synchronizing the time of the internal timer 31, which has been stopped, when the processor 30 wakes up. First, the processor 30 acquires the current time from the RTC timer 50 (FIG. 13: S230) and synchronizes the internal timer 31 to the acquired current time (S231).

Next, the interrupt handler INTHL2 acquires the entry address 42a and the next processing time 42c of the ID=0 from the management table 42 (S221). Next, the interrupt handler INTHL2 compares the current time acquired from the internal timer 31 with the next processing time 42c of the ID=0 (S222). In a case where the current time coincides with the next processing time of the ID=0 or in a case where the current time is after the next processing time of the ID=0 (S222: Yes), the interrupt handler INTHL2 executes the sensor A data acquisition process RT23 (S223). Next, the interrupt handler INTHL2 updates the next processing time 42c of the ID=0 with a value acquired by adding the processing interval 42b to the next processing time of the ID=0 (S224). The interrupt handler INTHL2 determines whether or not the process for all the sensor IDs registered in the management table 42 has ended (S225). Then, in a case where a result of the determination is "No", the interrupt handler INTHL2 executes the process of S221 to S225 for all the sensor IDs.

Figure 14:
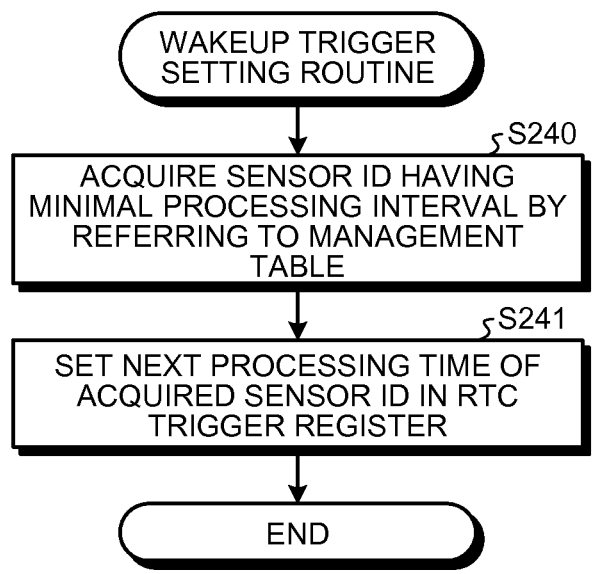
FIG. 14 is a flowchart that illustrates a wakeup trigger setting routine according to the second embodiment.

When the sensor data acquisition process ends in this way, the interrupt handler INTHL2 executes the wakeup trigger setting routine RT22 (S226). FIG. 14 is a flowchart that illustrates the wakeup trigger setting routine RT22. The wakeup trigger setting routine RT22 is a process for setting the next processing time of a sensor ID having a minimal processing interval into the RTC trigger register 51. The processor 30 acquires the sensor ID having the minimal processing interval from the management table 42 (S240). In this case, the sensor A (ID=0) corresponds to the sensor ID having the minimal processing interval. Next, the processor 30 sets the next processing time of the acquired sensor ID into the RTC trigger register 51 (S241).

Next, the operation of the processor system 110 will be described in detail with reference to the timing diagram illustrated in FIG. 3B. After the processor system 110 is started up, the application program AP2 is executed. The processor 30 initializes the sensors A, B, and C (FIG. 10: S200). Next, the processor 30 sets the management information of the sensors A to C in the management table 42 (S201). In this step, time 0 is set to the next processing time 42c of each of the sensors A to C. Next, the processor 30 sets an interrupt vector and the like such that the interrupt handler INTHL2 is executed when an interrupt request is received from the RTC timer 50 (S202). Then, in order to execute the data acquisition process of the first time, the processor 30 executes the interrupt handler INTHL2 (S203).

At time 0, first, the internal timer 31 is synchronized to the current time of the RTC timer 50 (FIG. 12: S220). At time 0, the value of the internal timer 31 is not changed but remains to be the time 0. Next, the processor 30 acquires the next processing time (0) of the ID=0 from the management table 42, acquires the current time (0) from the internal timer 31, and compares the current time (0) with the next processing time (0) (S222). Since the current time (0) and the next processing time (0) coincide with each other, the determination executed in S222 is "Yes". For this reason, the processor 30 executes the sensor A data acquisition process RT23 (S223). Next, the processor 30 updates the next processing time of the ID=0 with "the next processing time (0)+the processing interval (80)"=80 (S224). Also for ID=1 and ID=2, the processor 30, similarly, executes the sensor B data acquisition process RT24 and the sensor C data acquisition process RT25 and updates the next processing time thereof. The state of the management table 42 when the processes of the sensors A to C end is illustrated in FIG. 9. Next, the processor 30 executes the wakeup trigger setting routine RT22 (S226). The next processing time=80 of the ID=0 of which the processing interval is minimum is set in the RTC trigger register 51. Thereafter, when the process of the interrupt handler INTHL2 ends, the process is returned to the application program AP2. The application program AP2 causes the processor 30 to enter the sleep state.

Next, when it is time 80, the timer value of the RTC timer 50 coincides with the register value (=80) of the RTC trigger register 51. Accordingly, a processor wakeup request is issued from the RTC timer 50 to the PMU 20, and an interrupt request is notified from the RTC timer 50 to the processor 30. Accordingly, the processor 30 enters the active state and executes the interrupt handler INTHL2.

The interrupt handler INTHL2, first, synchronizes the internal timer 31 to the current time=80 of the RTC timer 50 (FIG. 12: S220). Thereafter, the processor 30 compares the next processing time (80) of the ID=0 with the current time (80) of the internal timer 31 (S222). Since the current time (80) and the next processing time (80) coincide with each other (S222: Yes), the processor 30 executes the sensor A data acquisition process RT23 (S223). Next, the processor 30 updates the next processing time of the ID=0 with "the next processing time (80)+the processing interval (80)"=160 (S224). Next, the processor 30 executes the process for the ID=1. At this time, the next processing time of the ID=1 is "100". Since the next processing time (100) of the ID=1>the current time (80) is satisfied (S222: No), the processor 30 does not execute the data acquisition process and the update of the next processing time for the ID=1. Similarly, the processor 30 does not execute the data acquisition process and the update of the next processing time for the ID=2. Next, the processor 30 executes the wakeup trigger setting routine RT22 (S226). The next processing time=160 of the ID=0 of which the processing interval is minimal is set in the RTC trigger register 51. Thereafter, when the process of the interrupt handler INTHL2 ends, the process is returned to the application program AP2. The application program AP2 causes the processor 30 to enter the sleep state.

Next, when it is time 160, the timer value of the RTC timer 50 coincides with the register value (=160) of the RTC trigger register 51. Accordingly, a processor wakeup request is issued from the RTC timer 50 to the PMU 20, and an interrupt request is notified from the RTC timer 50 to the processor 30. Accordingly, the processor 30 enters the active state and executes the interrupt handler INTHL2.

The interrupt handler INTHL2, first, synchronizes the internal timer 31 to the current time=160 of the RTC timer 50 (FIG. 12: S220). Thereafter, the processor 30 compares the next processing time (160) of the ID=0 with the current time (160) of the internal timer 31 (S222). Since the current time (160) and the next processing time (160) coincide with each other (S222: Yes), the processor 30 executes the sensor A data acquisition process RT23 (S223). Next, the processor 30 updates the next processing time of the ID=0 with "the next processing time (160)+the processing interval (80)"=240 (S224). Next, the processor 30 executes the process for ID=1. At this time, the next processing time of the ID=1 is "100", and "the current time (160)>the next processing time (100)" is satisfied (S222: Yes). Accordingly, the processor 30 executes the sensor B data acquisition process RT24 (S223). Next, the processor 30 updates the next processing time of the ID=1 with "the next processing time (100)+the processing interval (100)"=200 (S224). Also for ID=2, similarly, since the next processing time=125 is satisfied (S222: Yes), the sensor C data acquisition process RT25 is executed, and the next processing time is updated with "the next processing time (125)+the processing interval (125)"=250 (S224). Next, the processor 30 executes the wakeup trigger setting routine RT22 (S226). The next processing time=240 of the ID=0 of which the processing interval is minimal is set in the RTC trigger register 51.

Thereafter, when the process of the interrupt handler INTHL2 ends, the process is returned to the application program AP2. The application program AP2 causes the processor 30 to enter the sleep state.

Thereafter, similarly, the processor 30 is woken up only at time 240, time 320, time 400, and time 480, and, in a case where each time is the next processing time of each ID or after the next processing time, each data acquisition process is executed.

In this way, in the second embodiment, since the sensor data acquisition process is managed by the timer, also in a case where the sensor does not have an interrupt request function for a data processing request, the number of times of executing a transition of the processor 30 between the sleep state and the active state of the processor can be reduced. Accordingly, the power consumption of the processor 30 can be reduced.

Third Embodiment

In a third embodiment, a case is assumed in which sensors having an interrupt request function and a sensor not having an interrupt request function are mixed.

Figure 15:
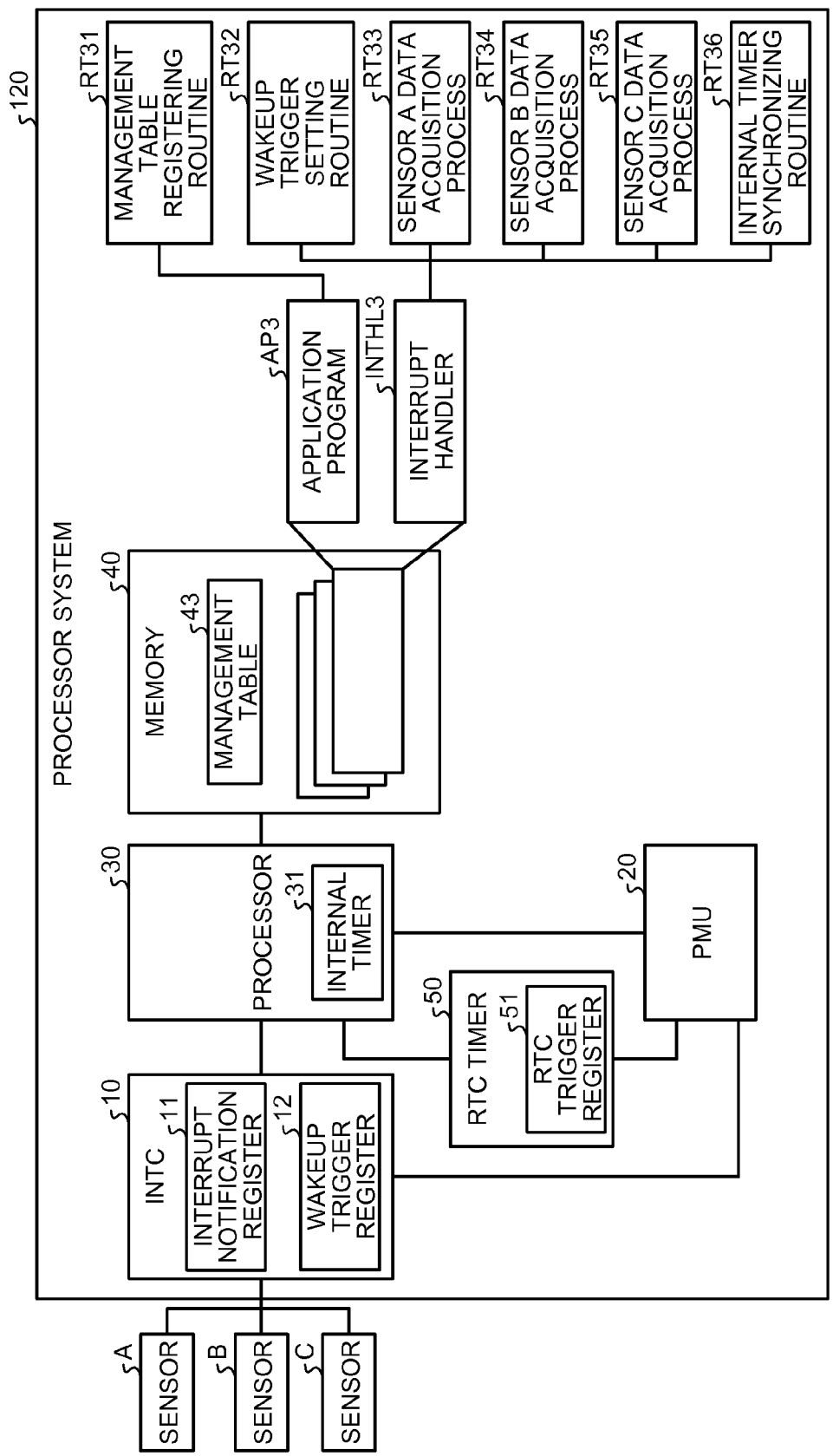
FIG. 15 is a block diagram that illustrates a processor system according to a third embodiment.

FIG. 15 is a functional block that illustrates a processor system 120 according to the third embodiment. Three sensors A, B, and C are connected to the processor system 120. The sensor A has an interrupt request function and generates sensed data at an interval of 80 msec. The sensor B does not have an interrupt request function but generates sensed data at an interval of 100 msec. The sensor B sets a processing interval by using the timer function described in the second embodiment. The sensor C has an interrupt request function and generates sensed data at an interval of 125 msec.

The processor system 120 includes an INTC 10 and an RTC timer 50. The functions of the INTC 10 and the RTC timer 50 are the same as those of the first embodiment or the second embodiment, and duplicate description will not be presented. A processor 30 includes an internal timer 31. A PMU 20 manages the supply of power to the INTC 10, the processor 30, a memory 40, the RTC timer 50, and the like included in the processor system 120. The PMU 20 wakes the processor 30 up according to a request from the INTC 10 or the RTC timer 50.

In the memory 40, a management table 43 and an application program AP3, an interrupt handler INTHL3, a management table registering routine RT31, a wakeup trigger setting routine RT32, a sensor A data acquisition process RT33, a sensor B data acquisition process RT34, a sensor C data acquisition process RT35, and an internal timer synchronizing routine RT36, which are executed by the processor 30, are stored.

Figures 16, 17:
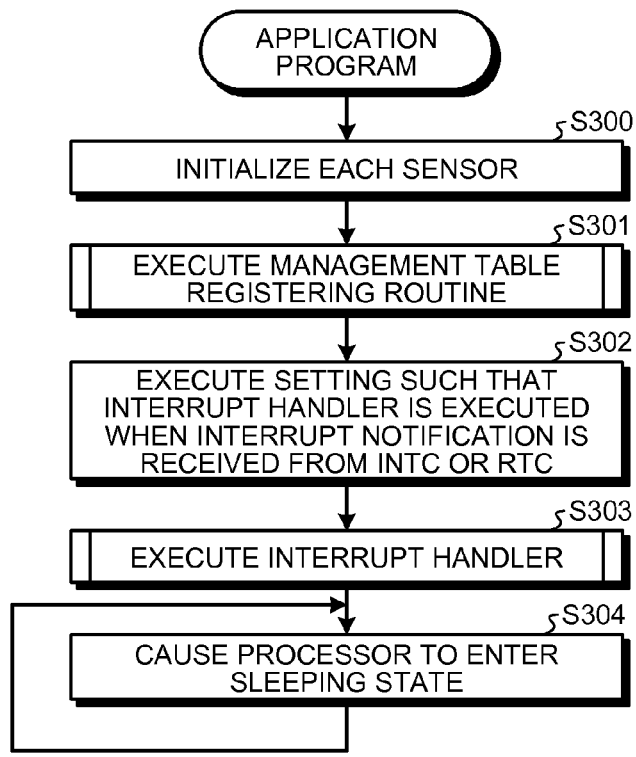
FIG. 16 is a diagram that illustrates a management table according to the third embodiment.
FIG. 17 is a flowchart that illustrates the operation sequence of an application program according to the third embodiment.

FIG. 16 is a diagram that illustrates the data structure of the management table 43. The management table 43 includes management information having a set of a sensor ID, an entry address 43a of a data acquisition process, a processing interval 43b, a next processing time (next_proc) 43c, and a trigger type 43d. The trigger type 43d is used for determining whether the data acquisition process is executed according to an interrupt request from the sensor (int) or is executed at a time interval managed by the timer (timer). The processor 30 executes the process of setting the management table 43 at the time of starting up the processor system 120.

Hereinafter, the operation according to the third embodiment will be described in detail. FIG. 17 is a flowchart that illustrates the operation sequence of the application program AP3. When the processor system 120 is started up, the processor 30 executes the application program AP3. The application program AP3 initializes the sensors A, B, and C (S300).

Figure 18:
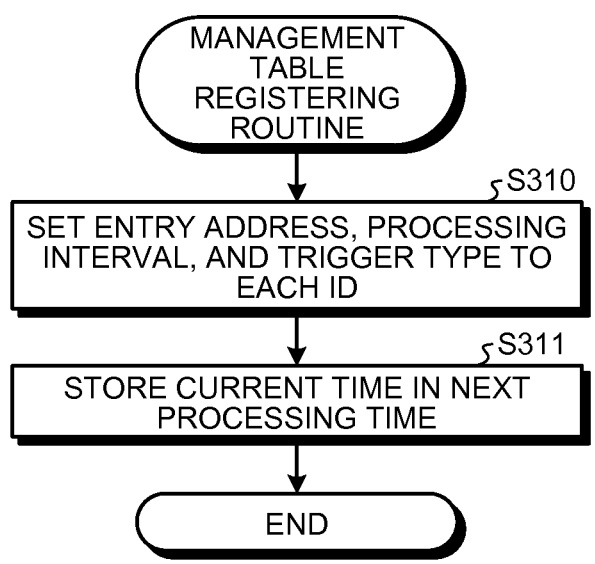
FIG. 18 is a flowchart that illustrates a management table registering routine according to the third embodiment.

Next, the processor 30 executes the management table registering routine RT31 (S301). FIG. 18 is a flowchart that illustrates the management table registering routine RT31. First, for each sensor ID, the entry address 43a, the processing interval 43b, and the trigger type 43d are set (FIG. 18: S310). Next, the processor 30 sets next processing time to the next processing time (next_proc) 43c of each sensor ID. When the management table registering routine RT31 is executed, the processor 30 sets current time (time 0) acquired from the internal timer 31 to the next processing time 43c (S311).

The processor 30 sets an interrupt vector and the like such that the interrupt handler INTHL3 is executed when an interrupt request from the INTC 10 or an interrupt request from the RTC timer 50 is received (FIG. 17: S302). Next, the processor 30 executes the interrupt handler INTHL3 (S303). Thereafter, the application program AP3 causes the processor 30 to enter the sleep state (S304).

Figure 19:
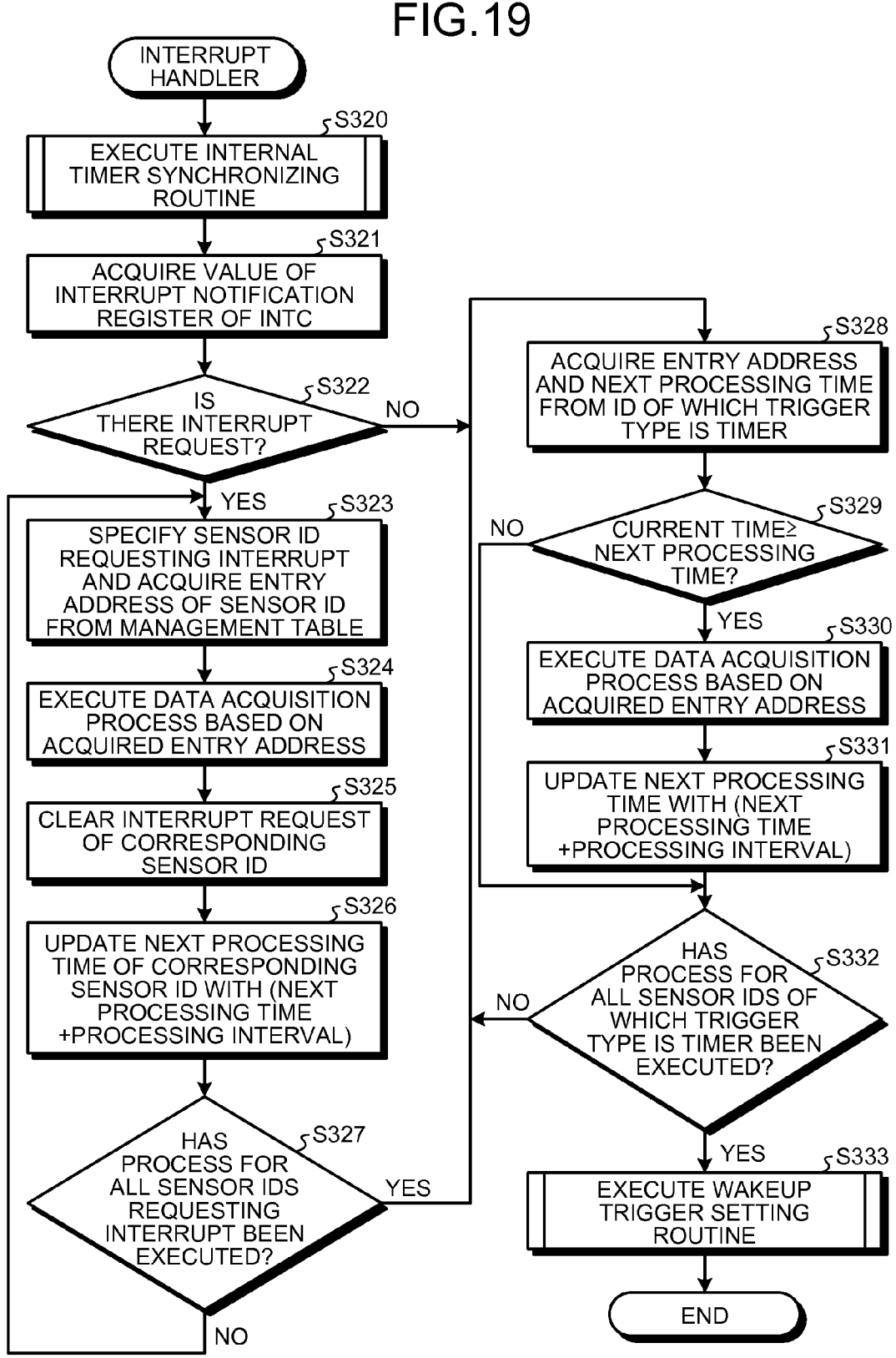
FIG. 19 is a flowchart that illustrates the operation sequence of an interrupt handler according to the third embodiment.

FIG. 19 is a flowchart that illustrates the operation sequence of the interrupt handler INTHL3. The interrupt handler INTHL3, first, executes the internal timer synchronizing routine RT36 (S320). The sequence of the internal timer synchronizing routine RT36 is similar to the sequence illustrated in FIG. 13. Next, the interrupt handler INTHL3 acquires the register value of the interrupt notification register 11 (S321). The interrupt handler INTHL3 checks whether or not an interrupt request from any one of the sensors A to C has occurred by referring to the acquired register value (S322). In a case where there is an interrupt request (S322: Yes), the interrupt handler INTHL3 acquires an entry address corresponding to the sensor ID issuing the interrupt request from the management table 43 (S323) and executes the data acquisition process designated by the acquired entry address (S324). Thereafter, the interrupt handler INTHL3 clears the interrupt flag of the corresponding sensor ID from "1" to "0" (S325). Next, the interrupt handler INTHL3 updates the next processing time of the sensor ID with a value acquired by adding the processing interval 43b to the next processing time 43c of the sensor ID having the interrupt request (S326). The interrupt handler INTHL3 determines whether or not the data acquisition process has been executed for all the sensor IDs of sensors, of which the trigger type is the interrupt, each having an interrupt flag of "1" (S327). In a case where a result of the determination is No, the same process as that described above is executed for all the sensor IDs each having an interrupt flag of "1".

Next, the interrupt handler INTHL3 acquires the entry address 43a and the next processing time 43c of the sensor ID of which the trigger type is the timer from the management table 43 (S328). Next, the interrupt handler INTHL3 compares the current time of the internal timer 31 with the next processing time 43c of the sensor ID, which has been acquired in S328 (S329). In a case where the next processing time 43c of the sensor ID is the current time or before the current time (S329: Yes), the interrupt handler INTHL3 executes the data acquisition process designated by the entry address of the sensor ID (S330). Next, the interrupt handler INTHL3 updates the next processing time with a value acquired by adding the processing interval 43b to the next processing time of the sensor ID (S331). The interrupt handler INTHL3 determines whether or not the process for all the sensor IDs of which the trigger type is the timer has ended (S332). Then, in a case where a result of the determination is "No", the interrupt handler INTHL3 executes the process of S328 to S332 for all the sensors of which the trigger type is the timer. Next, when the process ends for all the sensors of which the trigger type is the timer (S332: Yes), the interrupt handler INTHL3 executes the wakeup trigger setting routine RT32 (S333).

Figure 20:
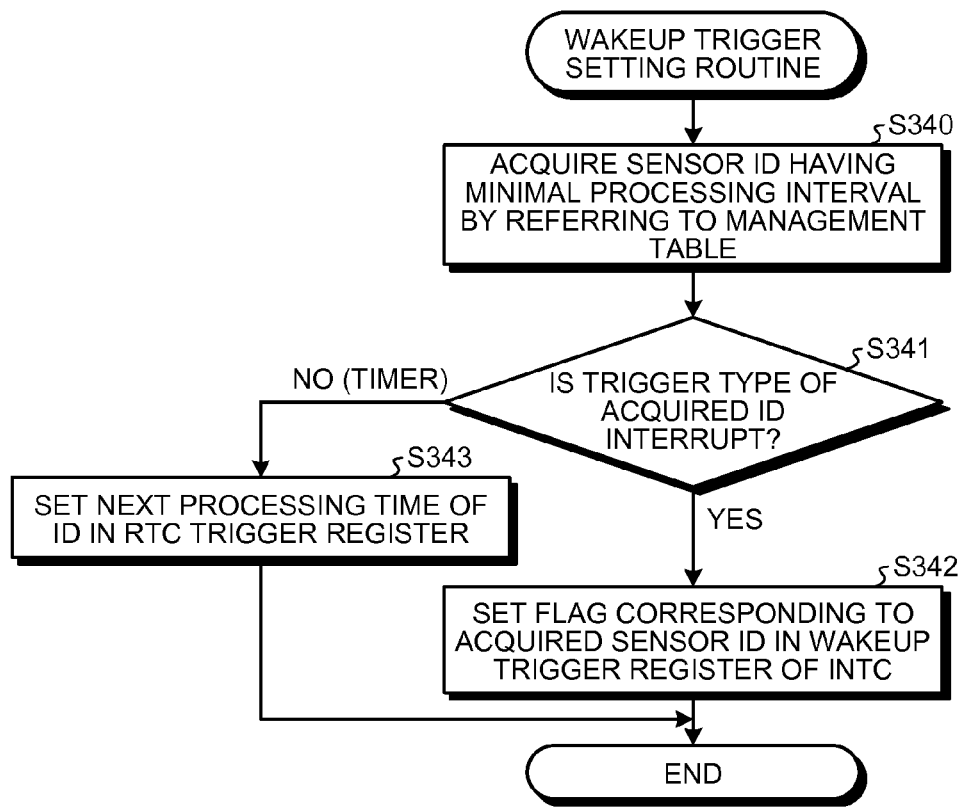
FIG. 20 is a flowchart that illustrates a wakeup trigger setting routine according to the third embodiment.

FIG. 20 is a flowchart that illustrates the wakeup trigger setting routine RT32. The processor 30 acquires a sensor ID having a minimal processing interval from the management table 43 (S340). In this case, the sensor ID having the minimal processing interval is the sensor A (ID=0). Next, the processor 30 determines whether the trigger type of the acquired sensor ID is the interrupt or the timer (S341). In a case where the trigger type is the interrupt (S341: Yes), the processor 30 sets the wakeup trigger register 12 such that a processor wakeup request is issued from the INTC 10 to the PMU 20 only when there is an interrupt process request from the sensor having the acquired ID (S342). In other words, the processor 30 sets the wakeup trigger flag of the acquired sensor ID to "1". In addition, in a case where the trigger type is the timer (S341: No), the RTC trigger register 51 is set according to the next processing time of the acquired sensor ID (S343).

Next, the operation of the processor system 120 will be described in more detail with reference to the timing diagram illustrated in FIG. 3B and the like. After the processor system 120 is started to operate, the application program AP3 is executed. The processor 30 initializes the sensors A, B, and C (FIG. 17: S300). Next, the processor 30 sets the management information of each of the sensors A to C in the management table 43 (S301). For the sensor A, ID=0, entry address=0x1100, interval=80, trigger type=int, and next_proc=0 are set. For the sensor B, ID=1, entry address=0x1200, interval=100, trigger type=timer, and next_proc=0 are set. For the sensor C, ID=2, entry address=0x1300, interval=125, trigger type=int, next_proc=0 are set. Next, the processor 30 sets the interrupt vector and the like such that the interrupt handler INTHL3 is executed when an interrupt request is received from the INTC 10 or the RTC timer 50 (S302). Then, in order to execute the data acquisition process of a first time, the processor 30 executes the interrupt handler INTHL3 (S303).

At time 0 that is sensing starting time, sensing operations of the sensors A to C are executed, whereby data is generated. The interrupt handler INTHL3 synchronizes the internal timer 31 (FIG. 19: S320). At time 0, the value of the internal timer 31 is not changed but remains to be the time 0. Next, the processor 30 acquires the register value of the interrupt notification register 11 (S321). At time 0, since there are interrupt requests from the sensors A and C, the register value is (101). Since there is "1" in the register value of the interrupt notification register 11, the interrupt handler INTHL3 executes the data acquisition process. First, the interrupt handler INTHL3 specifies a sensor ID having the interrupt request based on a bit position. In this case, first, ID=0 is selected. The interrupt handler INTHL3 acquires the entry address 0x1100 of the ID=0 from the management table 43 (S323) and executes the sensor A data acquisition process RT33 stored at the entry address 0x1100 of the memory 40 (S324). Next, the interrupt handler INTHL3 clears the interrupt flag of the ID=0 to "0" (S325). In addition, the interrupt handler INTHL3 updates the next processing time with 80 (=the next processing time (0)+the processing interval (80)) (S326). Similarly, the ID=2 is specified, the sensor C data acquisition process RT35 is executed, the interrupt flag of the ID=2 is further cleared to "0", and the next processing time is further updated (updated with 0+125=125).

Next, the processor 30 acquires the management information of the ID=1 of which the trigger type is the timer (S328). The processor 30 compares the next processing time (0) of the ID=1 with the current time (0) of the internal timer 31 (S329). Since the current time (0) and the next processing time (0) coincide with each other (S329: Yes), the processor 30 executes the sensor B data acquisition process RT34 (S330). Thereafter, the processor 30 updates the next processing time of the ID=1 with "the next processing time (0)+the processing interval (100)"=100 (S331). Then, since all the sensor IDs, of which the trigger type is the timer, have been processed as above, next, the processor 30 executes the wakeup trigger setting routine RT32 (S333). The processor 30 selects an ID=0 of which the processing interval is minimal (FIG. 20: S340), checks that the trigger type of the ID=0 is the interrupt (FIG. 20: Yes: S341), and sets the bit of the ID=0 of the wakeup trigger register 12 to "1" (S342). Accordingly, the wakeup trigger register 12 is set as (100).

Next, at time 80, an interrupt request is issued from the sensor A. Accordingly, the register value of the interrupt notification register 11 becomes (100), and the INTC 10 issues an interrupt notification to the processor 30 by using a level signal. The INTC 10 checks whether or not a bit having a value of "1" in the wakeup trigger register 12 has a value of "1" in the interrupt notification register 11. In this case, a result of the determination is "Yes", and the INTC 10 requests the PMU 20 to wake the processor 30 up. When the processor wakeup request is received from the INTC 10, the PMU 20 wakes the processor 30 up. When being woken up, the processor 30 receives an interrupt notification from the INTC 10, and accordingly, the processor 30 executes the interrupt handler INTHL3.

The interrupt handler INTHL3 synchronizes the internal timer 31. Thereafter, the processor 30 executes the sensor A data acquisition process RT33 based on the register value (100) of the interrupt notification register 11 and updates the next processing time of the ID=0 with 160 (=80+80). Next, the processor 30 acquires the management information of the ID=1. At time 80, since the current time (80) is not the next processing time (100) or after the next processing time, the processor 30 does not execute the data acquisition process. Thereafter, the wakeup trigger setting routine RT32 is executed, and the processor 30 is caused to enter the sleep state.

Next, at time 125, an interrupt request is issued from the sensor C. Accordingly, the register value of the interrupt notification register 11 becomes (001). However, since a bit of the ID=2 that corresponds to the sensor C is not "1" in both registers 11 and 12, the INTC 10 does not issue a processor wakeup request to the PMU 20. Accordingly, the processor 30 is maintained to be in the sleep state, and the sensor C data acquisition process is not executed.

Next, at time 160, an interrupt request is issued from the sensor A. Accordingly, the register value of the interrupt notification register 11 becomes (101). Since a bit of the ID=0 that corresponds to the sensor A is "1" in both the registers 11 and 12, the INTC 10 requests the PMU 20 to wake the processor 30 up. When the processor wakeup request is received from the INTC 10, the PMU 20 wakes the processor 30 up. When being woken up, the processor 30 receives an interrupt notification from the INTC 10 and thus, executes the interrupt handler INTHL3. After the synchronizing of the internal timer 31, the interrupt handler INTHL3 executes the data acquisition processes and the update of the next processing time of the ID=0 and ID=2 based on the register value (101) of the interrupt notification register 11.

Next, the processor 30 acquires the management information of the ID=1. The processor 30 compares the next processing time (100) of the ID=1 with the current time (160) of the internal timer 31. Since a condition that the current time (160) is the next processing time (100) or after the next processing time is satisfied, the processor 30 executes the data acquisition process of the ID=1 and further updates the next processing time. Next, the processor 30 executes the wakeup trigger setting routine RT32, selects an ID=0 of which the processing interval is minimal, and sets the wakeup trigger register 12 as (100). Thereafter, the processor 30 transits to the sleep state. In the wakeup trigger setting routine RT32, in a case where the same register value is constantly set to be overwritten into the wakeup trigger register 12, the process of S330 of the second time and after that may be omitted.

Thereafter, similarly, the processor 30 is woken up only at time 240, time 320, time 400, and time 480, and, at each time, for sensors of which the trigger type is the interrupt, the data acquisition processes are executed based on the value of the interrupt notification register 11, and, for sensors of which the trigger type is the timer, the data acquisition processes are executed based on the value of the next processing time.

Modified Example of Third Embodiment

In this modified example, a case will be considered in which a sensor having a minimal processing interval does not have an interrupt request function, but the processing interval is determined by the timer. A sensor A generates sensed data at a minimal interval of 80 msec and does not have the interrupt request function. A sensor B generates sensed data at an interval of 100 msec and does not have the interrupt request function. A sensor C generates sensed data at an interval of 125 msec and has the interrupt request function.

The operation of the processor system 120 will be described in more detail with reference to the timing diagram illustrated in FIG. 3B and the like. After the processor system 120 is started to operate, the application program AP3 is executed. The processor 30 initializes the sensors A, B, and C (FIG. 17: S300). Next, the processor 30 sets the management information of each of the sensors A to C in the management table 43 (S301). For the sensor A, ID=0, entry address=0x1100, interval=80, trigger type=timer, and next_proc=0 are set. For the sensor B, ID=1, entry address=0x1200, interval=100, trigger type=timer, and next_proc=0 are set. For the sensor C, ID=2, entry address=0x1300, interval=125, trigger type=int, and next_proc=0 are set. Next, the processor 30 sets the interrupt vector and the like such that the interrupt handler INTHL3 is executed when an interrupt request is received from the INTC 10 or the RTC timer 50 (S302). Then, in order to execute the data acquisition process of a first time, the processor 30 executes the interrupt handler INTHL3 (S303).

At time 0, sensing operations of the sensors A to C are executed, whereby data is generated. The interrupt handler INTHL3 synchronizes the internal timer 31 (FIG. 19: S320). At time 0, the value of the internal timer 31 is not changed but remains to be the time 0. Next, the processor 30 acquires the register value of the interrupt notification register 11. At time 0, since there is an interrupt request from the sensor C, the register value is (001). The interrupt handler INTHL3 executes the data acquisition process of the ID=2. The interrupt handler INTHL3 acquires the entry address 0x1300 of the ID=2 from the management table 43 (S323) and executes the sensor C data acquisition process RT35 designated by the entry address 0x1300 of the memory 40 (S324). Next, the interrupt handler INTHL3 clears the interrupt flag of the ID=2 to "0" (S325). In addition, the interrupt handler INTHL3 updates the next processing time with 125 (=the next processing time (0)+the processing interval (125)) (S326).

Next, the processor 30 acquires the management information of the ID=0 of which the trigger type is the timer (S328). The processor 30 compares the next processing time (0) of the ID=0 with the current time (0) of the internal timer 31 (S329). Since the current time (0) and the next processing time (0) coincide with each other (S329: Yes), the processor 30 executes the sensor A data acquisition process RT33 (S330). Thereafter, the processor 30 updates the next processing time of the ID=0 with "the next processing time (0)+the processing interval (80)"=80 (S331).

Next, the processor 30 acquires the management information of the ID=1 (S328). The processor 30 compares the next processing time (0) of the ID=1 with the current time (0) of the internal timer 31 (S329). Since the current time (0) and the next processing time (0) coincide with each other (S329: Yes), the processor 30 executes the sensor B data acquisition process RT34 (S330). Thereafter, the processor 30 updates the next processing time of the ID=1 with "the next processing time (0)+the processing interval (100)"=100 (S331). As above, since all the sensor IDs, of which the trigger type is the timer, have been processed, next, the processor 30 executes the wakeup trigger setting routine RT32 (S333). Accordingly, the processor 30 selects an ID=0 of which the processing interval is minimal (FIG. 20: S340) and sets the next processing time (80) of the ID=0 in the RTC trigger register 51 (S343).

Next, at time 80, the RTC timer 50 issues a processor wakeup request to the PMU 20 and issues an interrupt request to the processor 30. The PMU 20 wakes the processor 30 up. Accordingly, the processor 30 enters the active state and executes the interrupt handler INTHL3 according to the interrupt request from the RTC timer 50.

The interrupt handler INTHL3 synchronizes the internal timer 31 to the current time=80 of the RTC timer 50 (S320). Thereafter, the processor 30 acquires the value of the interrupt notification register 11. At this time, the register value of the interrupt notification register 11 is (000), and an interrupt request has not been issued (S322: No). Accordingly, the processor 30 compares the next processing time (80) of the ID=0 acquired from the management table 43 with the current time (80) of the internal timer 31 (S329). Since the current time (80) and the next processing time (80) coincide with each other (S329: Yes), the processor 30 executes the sensor A data acquisition process RT33 (S330). Then, the processor 30 updates the next processing time of the ID=0 with "the next processing time (80)+the processing interval (80)"=160 (S331). Next, the processor 30 executes the process for the ID=1. At this time, the next processing time of the ID=1 is 100. Since the next processing time (100) of the ID=1 is not the current time (80) or before the current time (S329: No), the processor 30 does not execute the data acquisition process and the update of the next processing time for the ID=1. Next, the processor 30 executes the wakeup trigger setting routine RT32 (S333). The next processing time=160 of the ID=0 of which the processing interval is minimal is set in the RTC trigger register 51. Thereafter, when the process of the interrupt handler INTHL3 ends, the process is returned to the application program AP3. The application program AP3 causes the processor 30 to enter the sleep state.

Next, at time 125, an interrupt request is issued from the sensor C. Accordingly, the register value of the interrupt notification register 11 becomes (001). Since a bit of the ID=2 corresponding to the sensor C is not "1" in both the registers 11 and 12, the INTC 10 does not issue a processor wakeup request to the PMU 20. For this reason, the processor 30 remains in the sleep state, and the sensor C data acquisition process is not executed.

At time 160, the RTC timer 50 issues a processor wakeup request to the PMU 20 and notifies the processor 30 of an interrupt request. The PMU 20 wakes the processor 30 up. Accordingly, the processor 30 remains in the active state and executes the interrupt handler INTHL3 according to the interrupt request from the RTC timer 50.

The interrupt handler INTHL3 synchronizes the internal timer 31 to the current time=160 of the RTC timer 50 (S320). Thereafter, the processor 30 acquires the value of the interrupt notification register 11. At this time, the register value of the interrupt notification register 11 is (001). Accordingly, the interrupt handler INTHL3 acquires the entry address 0x1300 of the ID=2 from the management table 43 (S323) and executes the sensor C data acquisition process RT35 designated by the entry address 0x1300 of the memory 40 (S324). Then, the interrupt handler INTHL3 clears the interrupt flag of the ID=2 to "0" (S325). In addition, the interrupt handler INTHL3 updates the next processing time (S326).

Thereafter, the processor 30 compares the next processing time (160) of the ID=0 that is stored in the management table 43 with the current time (160) of the internal timer 31 (S329). Since the current time (160) and the next processing time (160) coincide with each other, the processor 30 executes the sensor A data acquisition process RT33 (S330). Next, the processor 30 updates the next processing time of the ID=0 with "the next processing time (160)+the processing interval (80)"=240 (S331). Next, the processor 30 executes the process for the ID=1. At this time, the next processing time of the ID=1 is "100". Since the next processing time (100) of the ID=1 is the current time (160) or before the current time, the processor 30 executes the sensor B data acquisition process RT34 (S330). Then, the processor 30 updates the next processing time of the ID=1 with "the next processing time (100)+the processing interval (100)"=200 (S331). Next, the processor 30 executes the wakeup trigger setting routine RT32 (S333). The next processing time=240 of the ID=0 of which the processing interval is minimal is set in the RTC trigger register 51. Thereafter, when the process of the interrupt handler INTHL3 ends, the process is returned to the application program AP3. The application program AP3 causes the processor 30 to enter the sleep state.

Thereafter, similarly, the processor 30 is woken up only at time 240, time 320, time 400, and time 480, and, at each time, for sensors of which the trigger type is the interrupt, the data acquisition processes are executed based on the value of the interrupt notification register 11, and, for sensors of which the trigger type is the timer, the data acquisition processes are executed based on the value of the next processing time.

As above, according to the third embodiment, also in a case where sensors having the function for issuing an interrupt request and sensors not having the above-described function are mixed, the processor 30 can be caused to enter the sleep state for a longer time, whereby the power consumption can be reduced.

Fourth Embodiment

In the sensors A to C according to the first to third embodiments, there is a premise that a data lifetime is the same as the data acquisition interval. In a case where such a premise is satisfied, the processor 30 is woken up based on a minimal data acquisition interval, whereby sensor data is not lost. However, in a case where there is a sensor in which the data lifetime is shorter than the data acquisition interval, according to a control method in which the processor 30 is woken up based on the minimal data acquisition interval, there is a possibility that data is lost.

For example, it is assumed that the sensor has a first-in first-out buffer (FIFO) for storing and accumulating sensor data therein. When the FIFO is filled with sensor data, the processor 30 acquires all the data of the FIFO. In such a case, a data acquisition interval is a period until the FIFO becomes full from a vacant state, and a data lifetime is a period until next data is generated and is stored in the FIFO after the FIFO is full. When data is acquired after the data lifetime, a part of the data of the FIFO is overwritten, and a data loss occurs. Fourth to sixth embodiments can be applied to also such a case.

Figure 21:
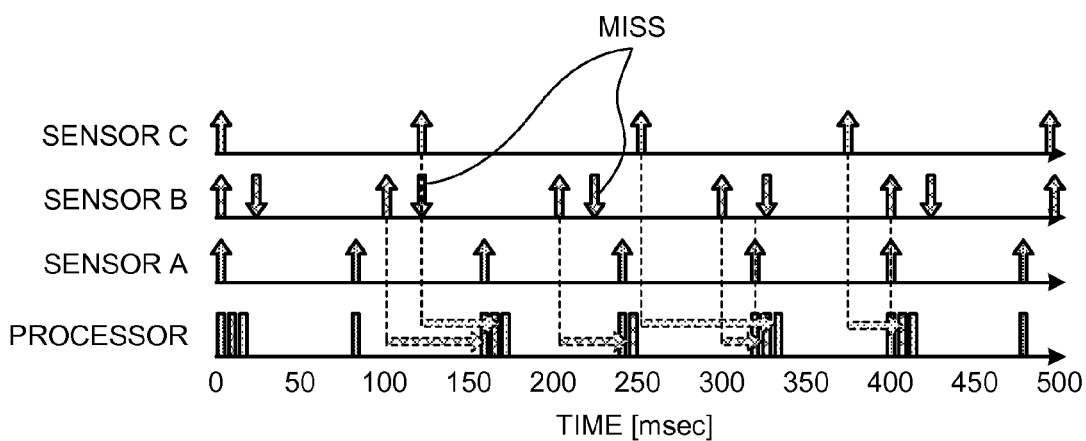
FIG. 21 is a timing diagram that illustrates the operations of sensors and a processor according to a comparative example.

FIG. 21 illustrates an example in which a data loss occurs in a case where the processor 30 is woken up based on a minimal data acquisition interval. Each upward arrow represents time at which sensed data is generated. Each downward arrow represents the deadline of sensed data. In the case illustrated in FIG. 21, a sensor B generates sensed data at an interval of 100 msec. The sensor B includes a FIFO therein, and a data lifetime is 25 msec and is shorter than the processing interval of 100 msec. Accordingly, for the sensor B, a period from the generation of data to the deadline of the data represents a data lifetime in the sensing period, and it is necessary to acquire data during the data lifetime. In the example illustrated in FIG. 21, the processor executes the data acquisition process based on the processing interval of 80 msec of the sensor A that is the minimal data acquisition interval, and accordingly, in each portion denoted by "miss", a loss of the data of the sensor B occurs.

Figure 22:
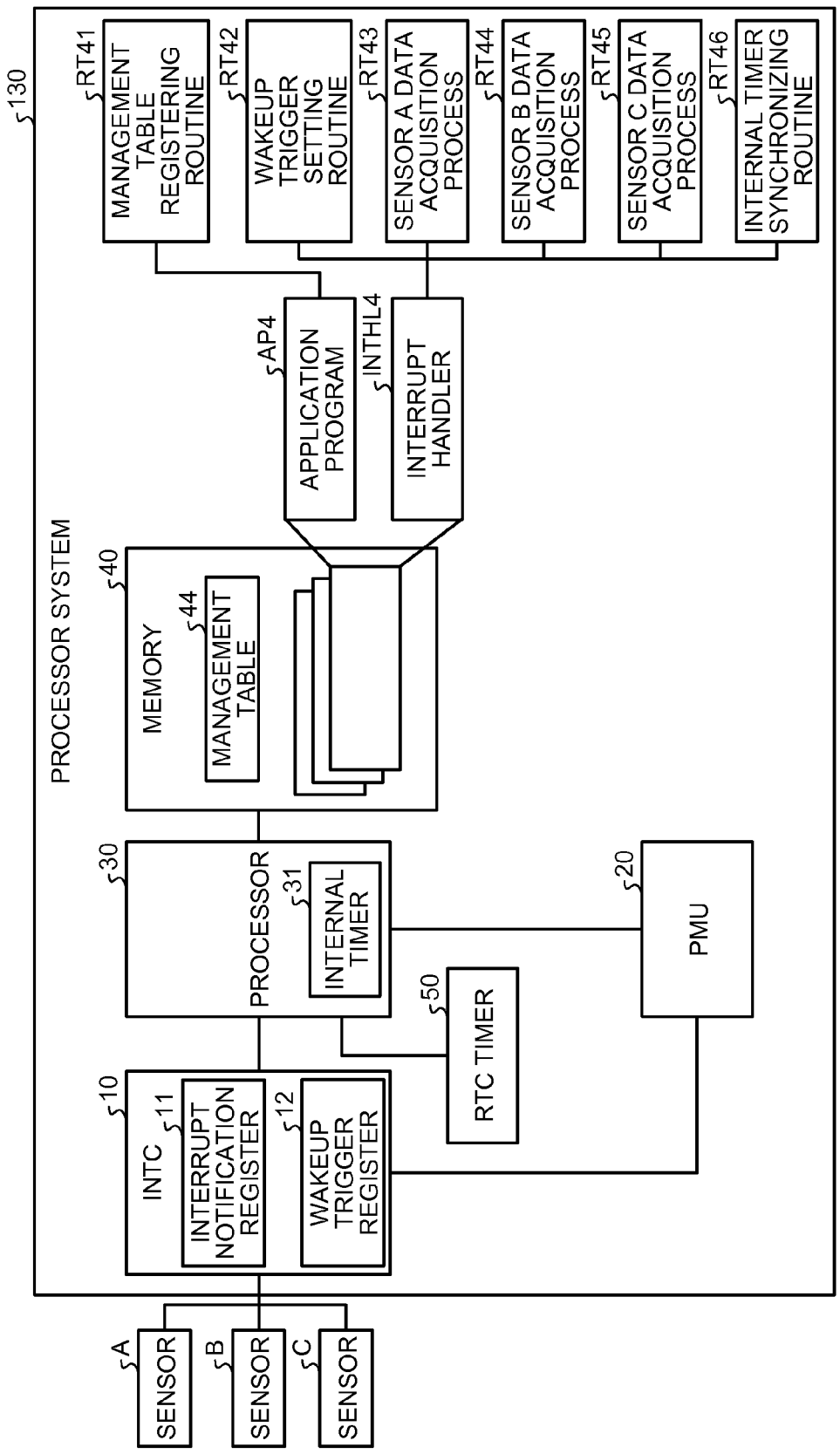
FIG. 22 is a block diagram that illustrates a processor system according to a fourth embodiment.

FIG. 22 is a functional block that illustrates a processor system 130 according to the fourth embodiment. Three sensors A, B, and C are connected to the processor system 130. The sensor A generates sensed data at an interval of 80 msec, and the data lifetime thereof is 80 msec that is the same as the processing interval. The sensor B generates sensed data at an interval of 100 msec. The sensor B includes an FIFO therein, and the data lifetime thereof is 25 msec. The sensor C generates sensed data at an interval of 125 msec, and the data lifetime thereof is 125 msec that is the same as the processing interval. Each of the sensors A to C has an interrupt request function.

The processor system 130 includes an INTC 10 and an RTC timer 50. The function of the INTC 10 is the same as that described in the previous embodiments, and duplicate description thereof will not be presented. The RTC timer 50 has a timer function but does not issue a processor wakeup request to the PMU 20. The processor 30 includes an internal timer 31. The PMU 20 manages the supply of power to the INTC 10, the processor 30, a memory 40, the RTC timer 50, and the like included in the processor system 130. The PMU 20 wakes the processor 30 up according to a request from the INTC 10.

In the memory 40, a management table 44 and an application program AP4, an interrupt handler INTHL4, a management table registering routine RT41, a wakeup trigger setting routine RT42, a sensor A data acquisition process RT43, a sensor B data acquisition process RT44, a sensor C data acquisition process RT45, and an internal timer synchronizing routine RT46, which are executed by the processor 30, are stored.

Figures 23, 24:
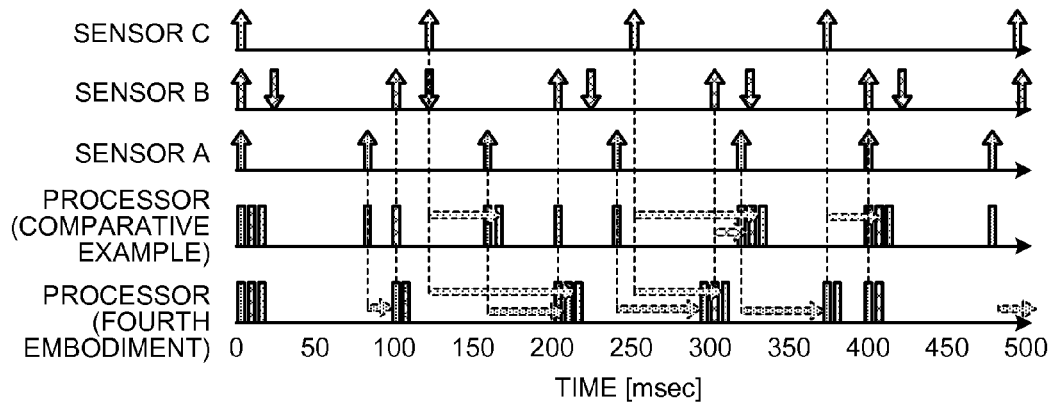
FIG. 23 is a diagram that illustrates a management table according to fourth and fifth embodiments.
FIG. 24 is a timing diagram that illustrates the operations of a sensor and a processor according to fourth to sixth embodiments.

FIG. 23 is a diagram that illustrates the data structure of the management table 44. The management table 44 includes management information having a set of a sensor ID and an entry address 44a of a data acquisition process, a processing interval 44b, a next processing time (next_proc) 44c, a data lifetime (lifetime) 44e, and next deadline (next_deadline) 44f. The data lifetime 44e represents a lifetime after the generation of sensor data in each sensing period. The next deadline 44f represents a deadline of the next sensor data. The processor 30 executes the process of setting the management table 44 at the time of starting up the processor system 130.

FIG. 24 is a timing diagram that illustrates a comparative example and a sensor data acquisition process according to the fourth embodiment. In FIG. 24, the timing diagrams of the sensors A to C are similar to those illustrated in FIG. 21. In the comparative example, in addition to the minimal data acquisition interval (the acquisition interval of the sensor A), the processor is woken up at time 100 and time 200. In the comparative example, from time 0 to time 500, the processor is woken up nine times. According to the fourth embodiment, timing at which the processor is woken up is dynamically changed based on the processing interval and the data lifetime. According to the fourth embodiment, from time 0 to time 500, the processor 30 is woken up six times. As above, according to the fourth embodiment, the number of times of execution of a state transition (the number of times of waking up) can be decreased to be less than that of the comparative example.

Figure 25:
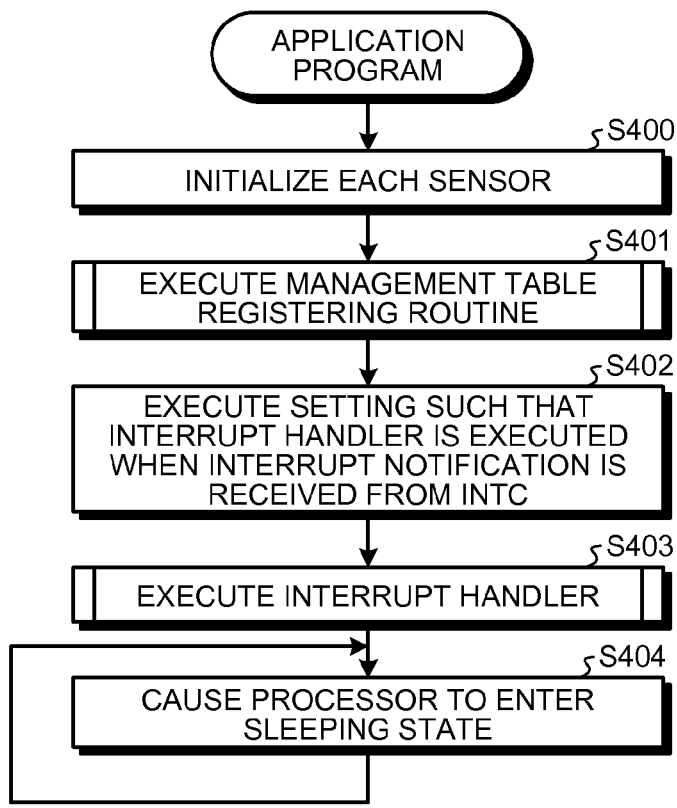
FIG. 25 is a flowchart that illustrates the operation sequence of an application program according to the fourth embodiment.

Hereinafter, the operation according to the fourth embodiment will be described in detail. FIG. 25 is a flowchart that illustrates the operation sequence of the application program AP4. When the processor system 130 is started to operate, the processor 30 executes the application program AP4. The application program AP4 initializes the sensors A, B, and C (S400).

Figure 26:
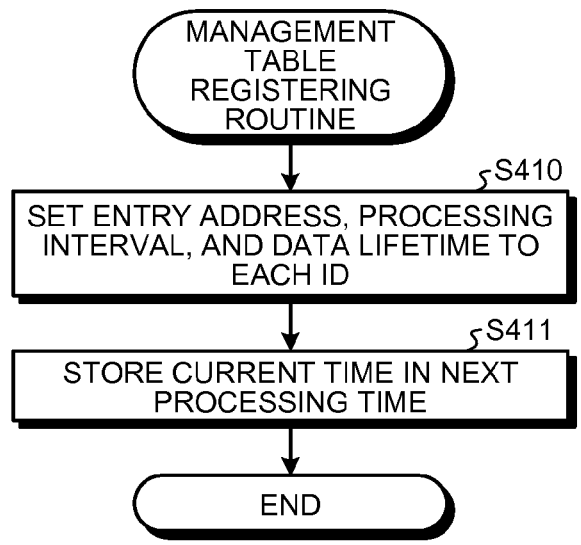
FIG. 26 is a flowchart that illustrates a management table registering routine according to the fourth embodiment.

Next, the processor 30 executes the management table registering routine RT41 (S401). FIG. 26 is a flowchart that illustrates the management table registering routine RT41. First, for each sensor ID, the entry address 44a, the processing interval 44b, and the data lifetime 44e are set (FIG. 26: S410). Next, the processor 30 sets next processing time to the next processing time 44c of each sensor ID. When the management table registering routine RT41 is executed, the processor 30 sets current time (time 0) acquired from the internal timer 31 to the next processing time 44c (S411).

The processor 30 sets an interrupt vector and the like such that the interrupt handler INTHL4 is executed when an interrupt request from the INTC 10 is received (FIG. 25: S402). Next, the processor 30 executes the interrupt handler INTHL4 (S403). Thereafter, the application program AP4 causes the processor 30 to enter the sleep state (S404).

Figure 27:
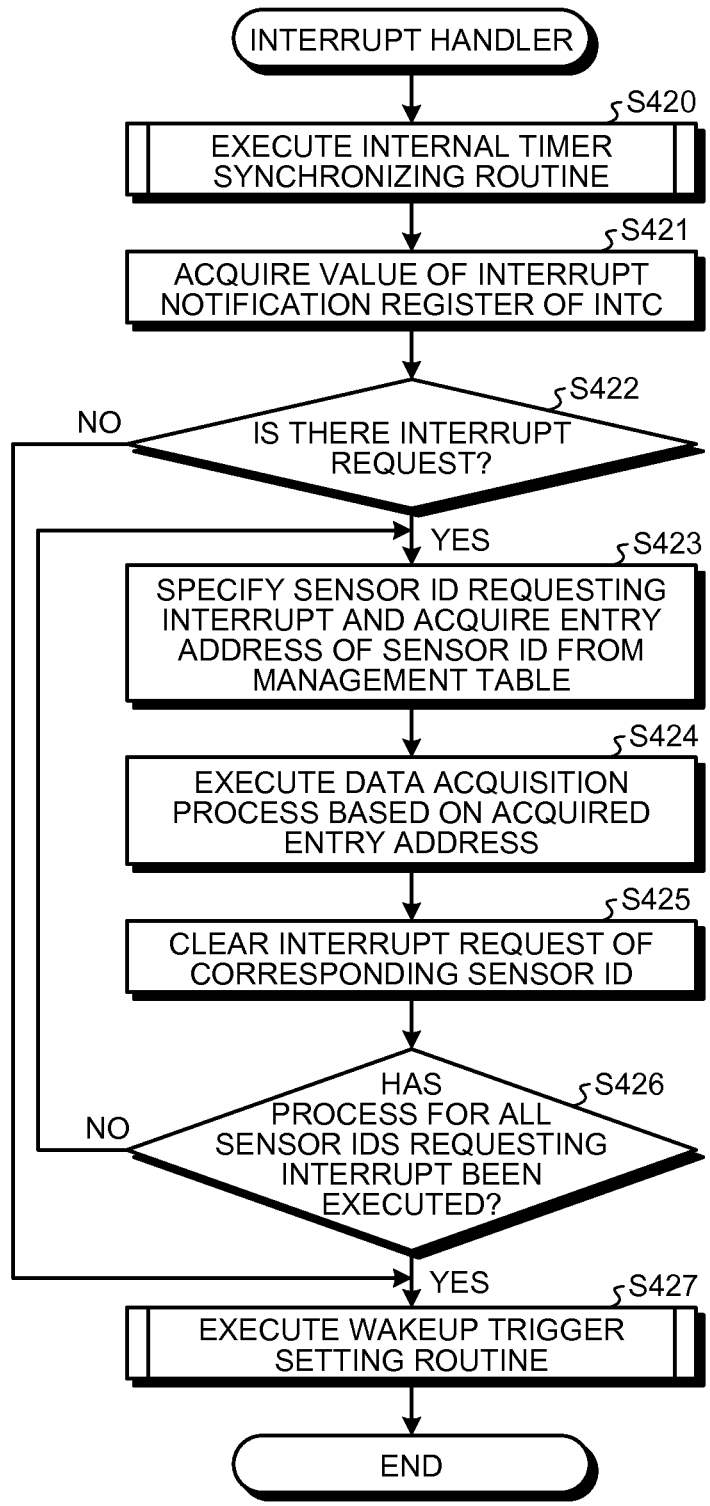
FIG. 27 is a flowchart that illustrates the operation sequence of an interrupt handler according to the fourth embodiment.

FIG. 27 is a flowchart that illustrates the operation sequence of the interrupt handler INTHL4. The interrupt handler INTHL4 executes the internal timer synchronizing routine RT46 (S420). The sequence of the internal timer synchronizing routine RT46 is similar to the sequence illustrated in FIG. 13. The processor 30 sets the current time acquired from the RTC timer 50 as the time of the internal timer 31. Next, the interrupt handler INTHL4 acquires the register value of the interrupt notification register 11 (S421). The interrupt handler INTHL4 checks whether or not an interrupt request from any one of the sensors A to C has occurred by referring to the acquired register value (S422). In a case where there is an interrupt request (S422: Yes), the interrupt handler INTHL4 acquires an entry address of the data acquisition process that corresponds to the sensor ID issuing the interrupt request from the management table 44 (S423) and executes the data acquisition process designated by the acquired entry address (S424). Then, the interrupt handler INTHL4 clears the interrupt flag of the corresponding sensor ID from "1" to "0" (S425). The interrupt handler INTHL4 determines whether or not the data acquisition process has been executed for all the sensor IDs each having an interrupt flag of "1" (S426). In a case where a result of the determination is No, the same process as that described above is executed for all the sensor IDs each having an interrupt flag of "1". Next, the interrupt handler INTHL4 executes the wakeup trigger setting routine RT42 (S427).

Figure 28:
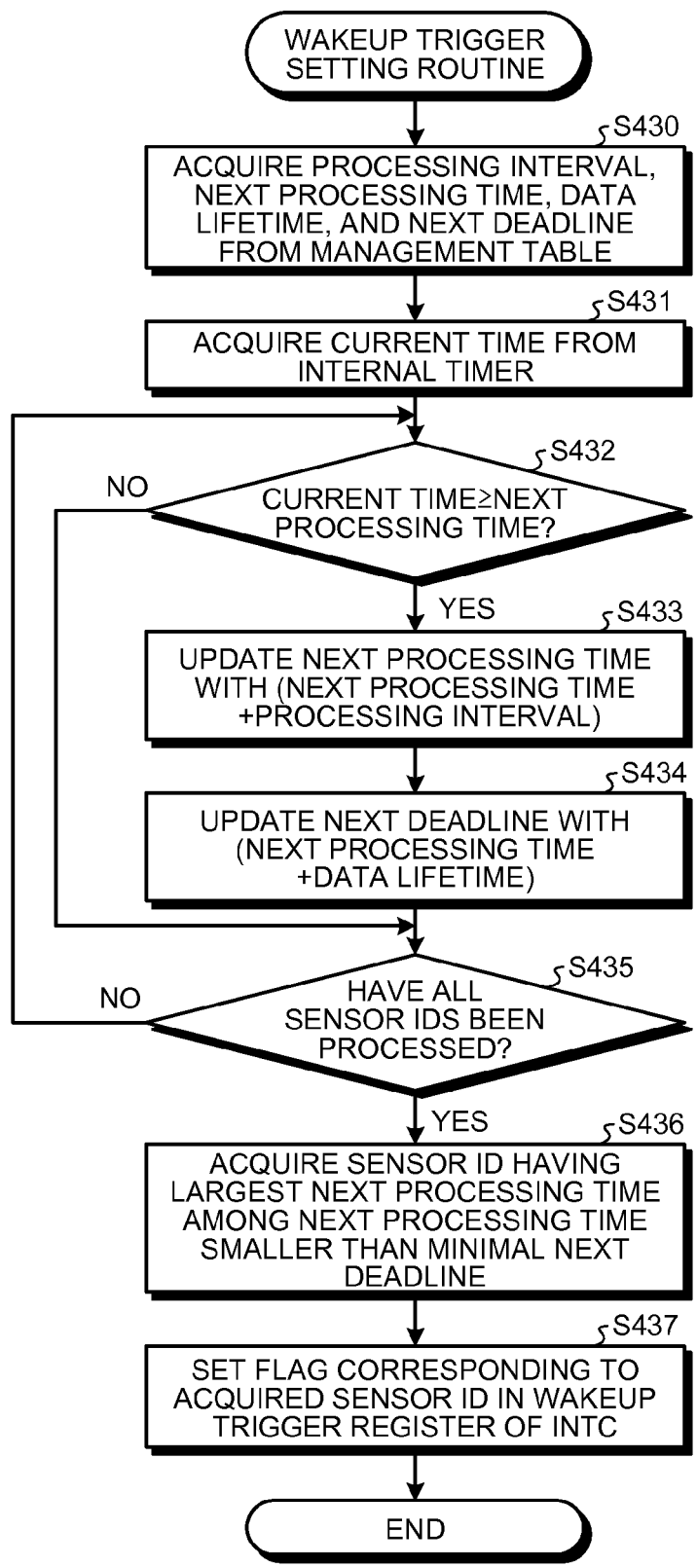
FIG. 28 is a flowchart that illustrates a wakeup trigger setting routine according to the fourth embodiment.

FIG. 28 is a flowchart that illustrates the wakeup trigger setting routine RT42. The processor 30 acquires the processing interval 44b, the next processing time 44c, the data lifetime 44e, and the next deadline 44f from the management table 44 (S430). Next, the processor 30 acquires the current time from the internal timer 31 (S431). Then, the processor 30 executes the following process for each sensor ID. The processor 30 determines whether or not the acquired current time is the next processing time or after the next processing time (S432). In a case where a result of the determination is "Yes", it represents that sensor data becomes available for the processor 30 during the sleep state. The sensor satisfying this condition has executed the data acquisition process in S424 illustrated in FIG. 27. Thus, instead of the process of S432, a sensor of which sensor data becomes available during the sleep state may be specified by identifying a sensor for which the register value of the interrupt notification register 11 is "1".

In a case where the result of S432 is "Yes", the processor 30 updates the next processing time 44c with a value acquired by adding the processing interval 44b to the pre-updated next processing time 44c (S433). In addition, the processor 30 updates the next deadline 44f with a value acquired by adding the data lifetime 44e to the updated next processing time 44c (S434). Such a process is repeatedly executed for all the sensor IDs (S432 to S435). Next, the processor 30 determines a minimum value of the next deadlines of all the sensor IDs and acquires a sensor ID having the largest (latest) next processing time from among the next processing time smaller than the minimum value (S436). Next, the processor 30 sets the wakeup trigger register 12 such that a processor wakeup request is issued from the INTC 10 to the PMU 20 only when there is an interrupt request from the sensor having the acquired ID (S437). In other words, the processor 30 sets the wakeup trigger flag of the acquired sensor ID to "1".

In this way, according to the fourth embodiment, the wakeup trigger setting routine RT42 is necessarily executed every time when the interrupt handler INTHL4 is executed. Accordingly, in the fourth embodiment, the sensor ID set in the wakeup trigger register 12 is dynamically changed.

Next, the operation of the processor system 130 will be described in more detail with reference to the timing diagram illustrated in FIG. 24 and the like. After the processor system 130 is started to operate, the application program AP4 is executed. The processor 30 initializes the sensors A, B, and C (FIG. 25: S400). Next, the processor 30 sets the management information of each of the sensors A to C in the management table 44 (S401). For the sensor A, ID=0, entry address=0x1100, interval=80, next_proc=0, lifetime=80, and next_deadline=0 are set. For the sensor B, ID=1, entry address=0x1200, interval=100, next_proc=0, lifetime=25, and next_deadline=0 are set. For the sensor C, ID=2, entry address=0x1300, interval=125, next_proc=0, lifetime=125, and next_deadline=0 are set. Next, the processor 30 sets the interrupt vector and the like such that the interrupt handler INTHL4 is executed when an interrupt request is received from the INTC 10 (S402). Then, in order to execute the data acquisition process of a first time, the processor 30 executes the interrupt handler INTHL4 (S403).

At time 0, sensing operations of the sensors A to C are executed, whereby data is generated. The interrupt handler INTHL4 synchronizes the internal timer 31 (FIG. 27: S420). At time 0, the value of the internal timer 31 remains to be "0". Next, the processor 30 acquires the register value of the interrupt notification register 11. At time 0, since there are interrupt requests from the sensors A to C, the register value is (111). The interrupt handler INTHL4 executes the data acquisition process. First, the interrupt handler INTHL4 specifies sensor IDs having interrupt requests by using bit positions. First, ID=0 is selected. The interrupt handler INTHL4 acquires the entry address 0x1100 of the ID=0 from the management table 44 (S423) and executes the sensor A data acquisition process RT43 stored by the entry address 0x1100 of the memory 40 (S424). Next, the interrupt handler INTHL4 clears the interrupt flag of the ID=0 to "0" (S425). In addition, the interrupt handler INTHL4 execute similar processes for ID=1 and ID=2.

Next, the processor 30 executes the wakeup trigger setting routine RT42 (S427). The processor 30 acquires the processing interval 44b, the next processing time 44c, the data lifetime 44e, and the next deadline 44f from the management table 44 (S430). Next, the processor 30 acquires the current time 0 from the internal timer 31 (S431). Then, the processor 30 compares the current time (0) with the next processing time (0) of the ID=0 (S432). Since the current time and the next processing time coincide with each other as a result of the comparison, the processor 30 updates the next processing time of the ID=0 with "the next processing time (0)+the processing interval (80)"=80 (S434). In addition, the processor 30 updates the next deadline of the ID=0 with "the next processing time (80)+the data lifetime (80)"=160 (S433). Similarly, the processor 30 updates the next processing time and the next deadline of each of the ID=1 and ID=2. For ID=1, the next processing time is updated with 100 (=0+100), and the next deadline is updated with 125 (=100+25). For ID=2, the next processing time is updated with 125 (=0+125), and the next deadline is updated with 250 (=125+125). FIG. 23 illustrates the management table 44 after the update of the management information. In the current state of the management table 44, a minimal next deadline is 125 msec of the sensor B (ID=1). In addition, among the next processing time before 125 msec, a maximal next processing time is 100 msec of the sensor B. The processor 30 acquires ID=1 as a sensor ID set in the wakeup trigger register 12 (S436). The processor 30 sets the wakeup trigger register 12 to a register value (010) (S437). When the process of the interrupt handler INTHL4 ends, the process is returned to the application program AP4. The application program AP4 causes the processor 30 to enter the sleep state (FIG. 25: S404).

Next, at time 80, an interrupt request is issued from the sensor A, and the register value of the interrupt notification register 11 becomes (100). At this time, the register value of the wakeup trigger register 12 is (010). For this reason, the INTC 10 does not issue a processor wakeup request to the PMU 20. Accordingly, the processor 30 remains to be in the sleep state and does not execute the data acquisition process.

Next, at time 100, an interrupt request is issued from the sensor B, and the register value of the interrupt notification register 11 becomes (110). At this time, the register value of the wakeup trigger register 12 is (010). For this reason, the INTC 10 issues a processor wakeup request to the PMU 20. Accordingly, the processor 30 is woken up, and the sensor A data acquisition process and the sensor B data acquisition process are executed by the interrupt handler INTHL4.

After the execution of the data acquisition processes, the processor 30 executes the wakeup trigger setting routine RT42. The processor 30 compares the current time (100) with the next processing time (80) of the sensor A. Since the current time (100) is after the next processing time (80), the processor 30 updates the next processing time with "the next processing time (80)+the processing interval (80)"=160. In addition, the processor 30 updates the next deadline with "the next processing time (160)+the data lifetime (80)"=240. Similarly, the processor 30 compares the current time (100) with the next processing time (100) of the sensor B. Since the current time (100) is the next processing time (100) or after the next processing time, the processor 30 updates the next processing time with "the next processing time (100)+the processing interval (100)"=200 and updates the next deadline with "the next processing time (200)+the data lifetime (25)"=225. For the sensor C, since the next processing time (125) is after the current time (100), the current next processing time (125) and the current next deadline (250) are not updated. In the current state of the management table 44, a minimal next deadline is 225 msec of the sensor B, and a maximum value of the next processing time before 225 msec is 200 msec of the sensor B. Accordingly, the processor 30 acquires ID=1 as a sensor ID set in the wakeup trigger register 12. The processor 30 sets the wakeup trigger register 12 to a register value (010). When the process of the interrupt handler INTHL4 ends, the process is returned to the application program AP4. The application program AP4 causes the processor 30 to enter the sleep state.

Thereafter, similarly, the processor 30 is woken up only at time 200, time 300, time 375, and time 400, and, the data acquisition processes for a sensor having an interrupt request until each time are executed.

According to the fourth embodiment, based on the data generation period of the sensor and the data lifetime, the timing for waking up the processor is dynamically changed so as not to allow an occurrence of a data loss. For this reason, the number of times of execution of a transition of the processor 30 between the sleep state and the active state can be decreased, and the power consumption of the processor 30 can be reduced. In addition, since any data acquisition process is not executed by the processor 30 after the deadline of the data, there is no loss of the sensed data.

Fifth Embodiment

In a fifth embodiment, similar to the fourth embodiment, a case is considered in which a sensor of which the data lifetime is shorter than the data acquisition interval is present. In addition, similar to the second embodiment, a case is considered in which all the sensors A to C do not have the interrupt request function. Also in the fifth embodiment, the processor 30 is woken up at timing represented in the timing diagram illustrated on the lowermost side in FIG. 24 and executes the data acquisition operation.

Figure 29:
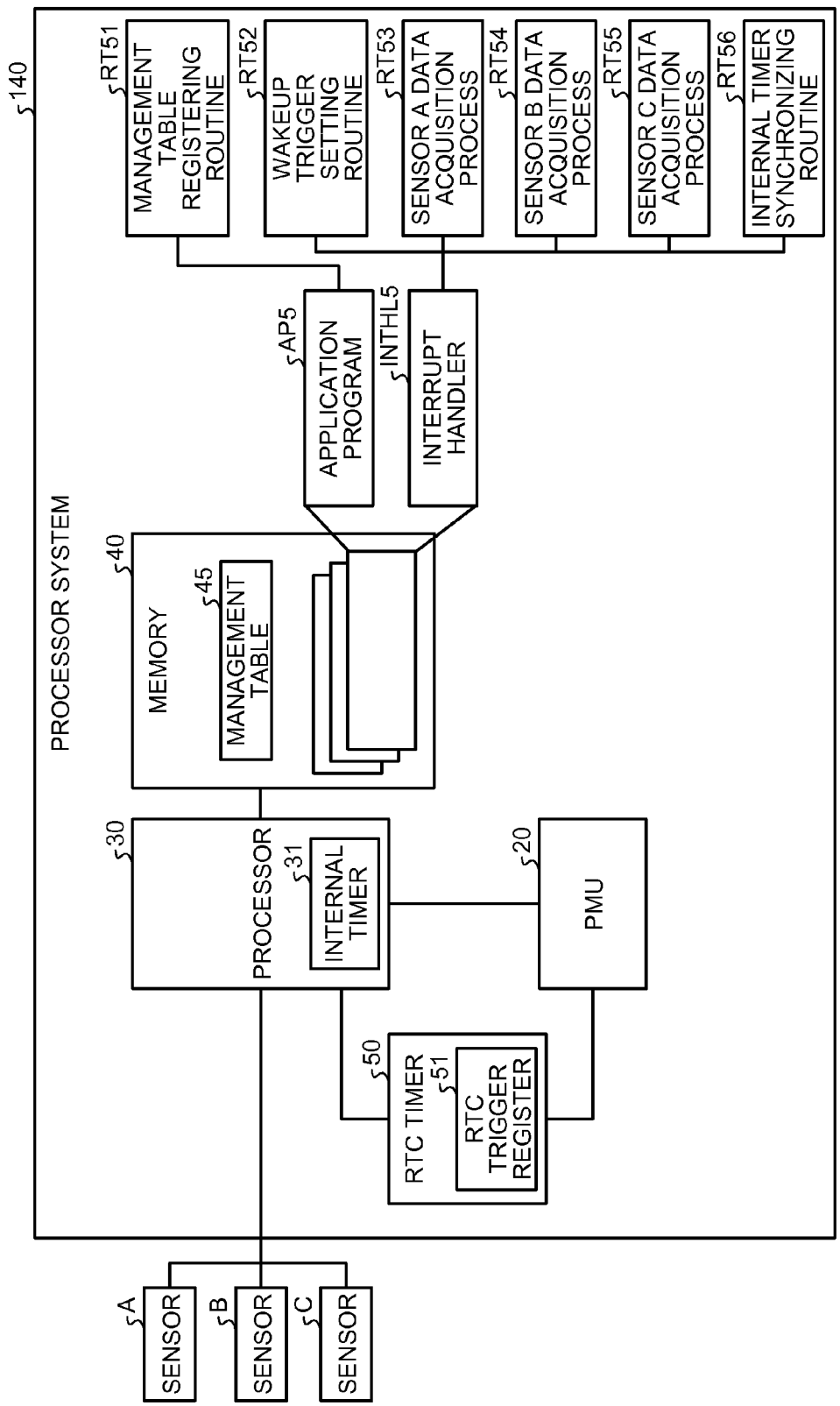
FIG. 29 is a block diagram that illustrates a processor system according to a fifth embodiment.

FIG. 29 is a functional block that illustrates a processor system 140 according to the fifth embodiment. Three sensors A, B, and C are connected to the processor system 140. The sensor A generates sensed data at an interval of 80 msec, and the data lifetime thereof is 80 msec. The sensor B generates sensed data at an interval of 100 msec. The sensor B includes an FIFO therein, and the data lifetime thereof is 25 msec. The sensor C generates sensed data at an interval of 125 msec, and the data lifetime thereof is 125 msec. Each of the sensors A to C does not have an interrupt request function.

The processor system 140 includes an RTC timer 50. The function of the RTC timer 50 is the same as that described in the second embodiment, and duplicate description thereof will not be presented. A processor 30 includes an internal timer 31. A PMU 20 manages the supply of power to the processor 30, a memory 40, the RTC timer 50, and the like included in the processor system 140. The PMU 20 wakes the processor 30 up according to a request from the RTC timer 50.

In the memory 40, a management table 45 and an application program AP5, an interrupt handler INTHL5, a management table registering routine RT51, a wakeup trigger setting routine RT52, a sensor A data acquisition process RT53, a sensor B data acquisition process RT54, a sensor C data acquisition process RT55, and an internal timer synchronizing routine RT56, which are executed by the processor 30, are stored.

The data structure of the management table 45 is the same as the management table 44 illustrated in FIG. 23. The management table 45 includes management information having a set of a sensor ID, an entry address 45a, a processing interval 45b, a next processing time (next_proc) 45c, a data lifetime (lifetime) 45e, and a next deadline (next_deadline) 45f.

Figure 30:
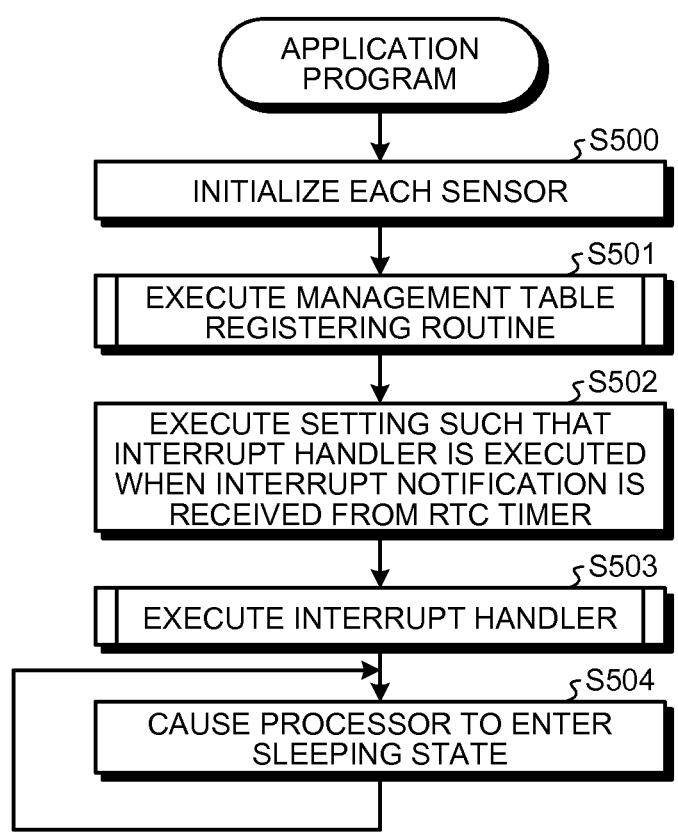
FIG. 30 is a flowchart that illustrates the operation sequence of an application program according to the fifth embodiment.

Hereinafter, the operation according to the fifth embodiment will be described in detail. FIG. 30 is a flowchart that illustrates the operation sequence of the application program AP5. When the processor system 140 is started to operate, the processor 30 executes the application program AP5. The application program AP5 initializes the sensors A, B, and C (S500).

Next, the processor 30 executes the management table registering routine RT51 (S501). The management table registering routine RT51 is the same as the management table registering routine RT31 illustrated in FIG. 26. The processor 30 sets an interrupt vector and the like such that the interrupt handler INTHL5 is executed when an interrupt request from the RTC timer 50 is received (S502). Next, the processor 30 executes the interrupt handler INTHL5 (S503). Thereafter, the application program AP5 causes the processor 30 to enter in the sleep state (S504).

Figure 31:
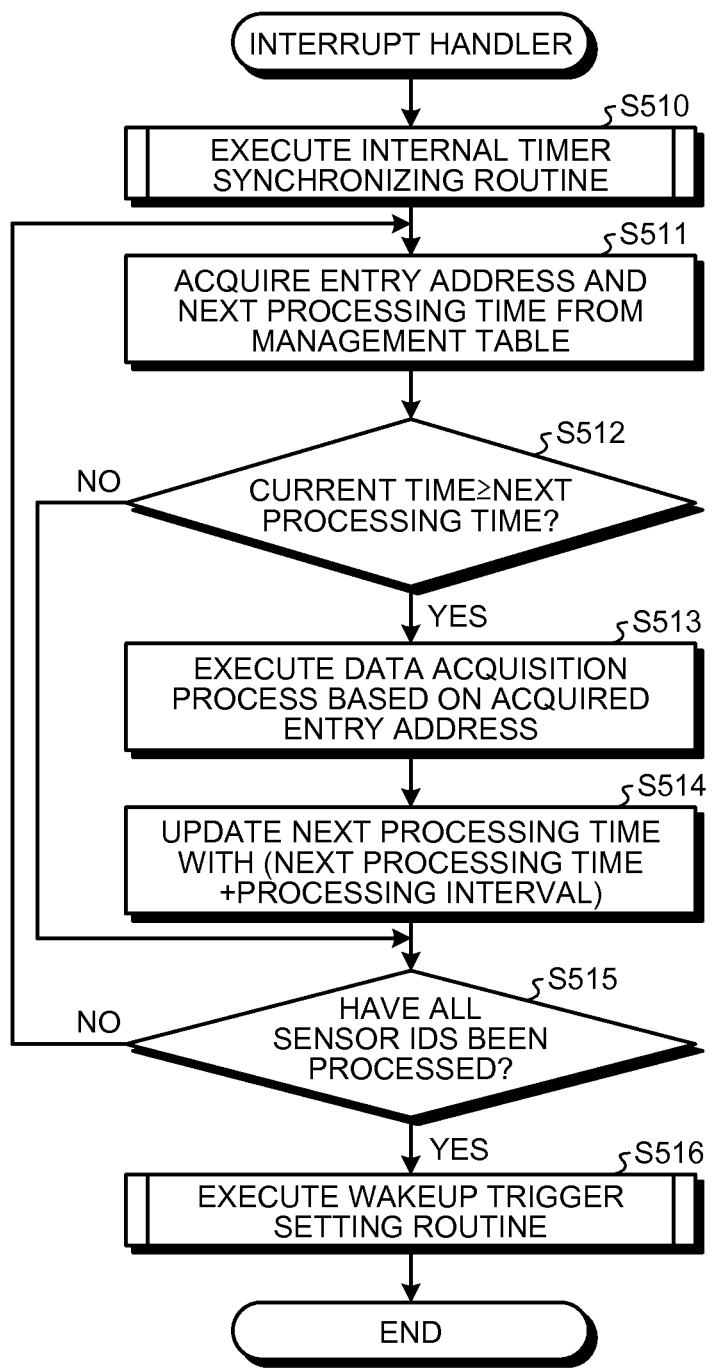
FIG. 31 is a flowchart that illustrates the operation sequence of an interrupt handler according to the fifth embodiment.

FIG. 31 is a flowchart that illustrates the operation sequence of the interrupt handler INTHL5. The interrupt handler INTHL5 executes the internal timer synchronizing routine RT56 (S510). The sequence of the internal timer synchronizing routine RT56 is similar to the sequence illustrated in FIG. 13. In other words, the processor 30 sets the current time acquired from the RTC timer 50 as the time of the internal timer 31. Next, the interrupt handler INTHL5 acquires the entry address 45a and the next processing time 45c of the ID=0 from the management table 45 (S511). Next, the interrupt handler INTHL5 compares the current time acquired from the internal timer 31 with the next processing time (next_proc) 45c of the ID=0 (S512). In a case where the current time is the next processing time of the ID=0 or after the next processing time (S512: Yes), the interrupt handler INTHL5 executes the sensor A data acquisition process RT53 (S513). Next, the interrupt handler INTHL5 updates the next processing time of the ID=0 with a value acquired by adding the processing interval 45b to the next processing time of the ID=0 (S514). The interrupt handler INTHL5 determines whether or not the process for all the sensor IDs registered in the management table 45 has ended (S515). Then, in a case where a result of the determination is "No", the interrupt handler INTHL5 executes the process of S511 to S515 for all the sensor IDs. Next, the interrupt handler INTHL5 executes the wakeup trigger setting routine RT52 (S516).

Figure 32:
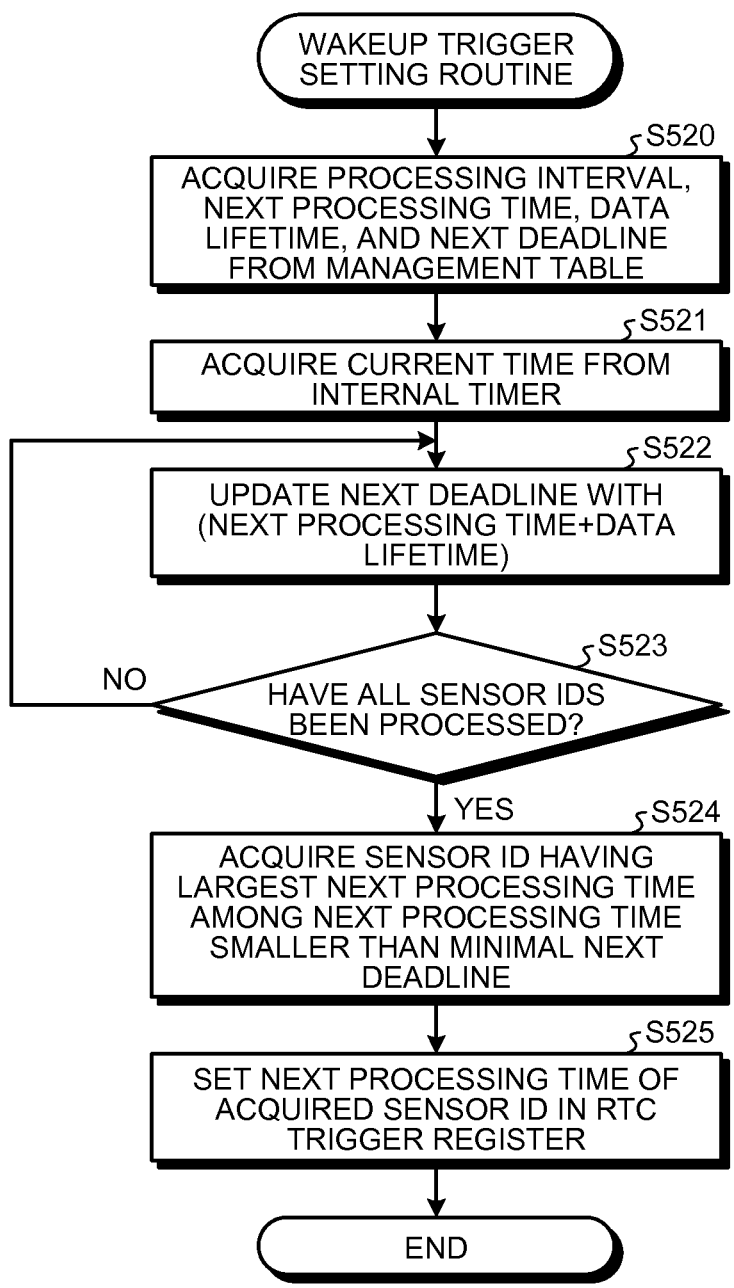
FIG. 32 is a flowchart that illustrates a wakeup trigger setting routine according to the fifth embodiment.

FIG. 32 is a flowchart that illustrates the wakeup trigger setting routine RT52. The processor 30 acquires the processing interval 45*b*, the next processing time 45*c*, the data lifetime 45*e*, and the next deadline 45*f* from the management table 45 (S520). Next, the processor 30 acquires the current time from the internal timer 31 (S521). Then, the processor 30 executes the following process for each sensor ID. The processor 30 updates the next deadline 45*f* with a value acquired by adding the data lifetime 45*e* to the next processing time 45*c*, which has been updated in S514 (S522). Such a process is repeatedly executed for all the sensor IDs (S522 to S523). Next, the processor 30 determines a minimum value of the next deadlines of all the sensor IDs and acquires a sensor ID having a largest (latest) next processing time among the next processing time smaller than the minimum value (S524). Next, the processor 30 sets the next processing time of the acquired sensor ID in the RTC trigger register 51 (S525).

Next, the operation of the processor system 140 will be described in more detail with reference to the timing diagram illustrated in FIG. 24 and the like. After the processor system 140 is started to operate, the application program AP5 is executed. The processor 30 initializes the sensors A, B, and C (FIG. 30: S500). Next, the processor 30 sets the management information of each of the sensors A to C in the management table 45 (S501). For the sensor A, ID=0, entry address=0x1100, interval=80, next_proc=0, lifetime=80, and next_deadline=0 are set. For the sensor B, ID=1, entry address=0x1200, interval=100, next_proc=0, lifetime=25, and next_deadline=0 are set. For the sensor C, ID=2, entry address=0x1300, interval=125, next_proc=0, lifetime=125, and next_deadline=0 are set. Next, the processor 30 sets the interrupt vector and the like such that the interrupt handler INTHL5 is executed when an interrupt request is received from the RTC timer 50 (S502). Then, in order to execute the data acquisition process of a first time, the processor 30 executes the interrupt handler INTHL5 (S503).

At time 0, sensing operations of the sensors A to C are executed, whereby data is generated. The interrupt handler INTHL5 synchronizes the internal timer 31 (FIG. 31: S510). At time 0, the value of the internal timer 31 remains to be "0". Next, the interrupt handler INTHL5 acquires the entry address (0x1100) and the next processing time (0) of the ID=0 from the management table 45 (S511). Next, the interrupt handler INTHL5 compares the current time (0) acquired from the internal timer 31 with the next processing time (0) of the ID=0 (S512). Since the condition of S512 is satisfied, the interrupt handler INTHL5 executes the sensor A data acquisition process RT53 (S513). Next, the interrupt handler INTHL5 updates the next processing time with "the next processing time (0)+the processing interval (80)"=80 (S514). In addition, the interrupt handler INTHL5 executes a similar process for the ID=1 and the ID=2.

Next, the interrupt handler INTHL5 executes the wakeup trigger setting routine RT52 (S516). The processor 30 acquires the processing interval 45*b*, the data lifetime 45*e*, and the next deadline 45*f* from the management table 45 (S520). Next, the processor 30 acquires the current time 0 from the internal timer 31 in Step 521. The processor 30 updates the next deadline of the ID=0 with "the next processing time (80) updated in S514+the data lifetime (80)"=160 (S522). Similarly, the processor 30 updates the next deadline of the ID=1 with 125 (=100+25) and updates the next deadline of the ID=2 with 250 (=125+125). In the current state of the management table 45, a minimal next deadline is 125 msec of the sensor B (ID=1). In addition, among the next processing time before 125 msec, a maximal next processing time is 100 msec of the sensor B. The processor 30 acquires ID=1 as a sensor ID set in the wakeup trigger register 12 (S524). Next, the processor 30 sets the next processing time (=100) of the acquired sensor ID in the RTC trigger register 51 (S525). When the process of the interrupt handler INTHL5 ends, the process is returned to the application program AP5. The application program AP5 causes the processor 30 to enter the sleep state (FIG. 30: S504).

Next, when it is time 100, the timer value of the RTC timer 50 coincides with the register value (=100) of the RTC trigger register 51. Accordingly, a processor wakeup request is issued from the RTC timer 50 to the PMU 20, and an interrupt request is notified from the RTC timer 50 to the processor 30. Accordingly, the processor 30 is in the active state and executes the interrupt handler INTHL5.

The interrupt handler INTHL5 synchronizes the internal timer 31 to the current time=100 of the RTC timer 50 (S510). The interrupt handler INTHL5 acquires the next processing time (80) of the sensor A (ID=0) from the management table 45 (S511) and compares the current time (100) with the next processing time (80) (S512). At this time, since the condition of S512 is satisfied, the processor 30 executes the sensor A data acquisition process RT53 (S513). Next, the interrupt handler INTHL5 updates the next processing time of the ID=0 with "the next processing time (80)+the processing interval (80)"=160 (S514). Next, the process is executed for the sensor B. Since the current time is (100), and the next processing time of the sensor B is (100), the condition of S512 is satisfied. The processor 30 executes the sensor B data acquisition process RT54. Thereafter, the interrupt handler INTHL5 updates the next processing time of the ID=1 with "the next processing time (100)+the processing interval (100)"=200. Since the next processing time of the sensor C is (125) and is after the current time (100), the condition of S512 is not satisfied. For this reason, the data acquisition process and the update of the next processing time for the sensor C are not executed. Next, the processor 30 executes the wakeup trigger setting routine RT52 (S516).

The processor 30 acquires the processing interval 45*b*, the next processing time 45*c*, the data lifetime 45*e*, and the next deadline 45*f* from the management table 45 (S520). Next, the processor 30 acquires the current time (100) from the internal timer 31 (S521). Then, the processor 30 executes the following process for each sensor ID. The processor 30 updates the next deadline 45*f* with a value acquired by adding the data lifetime 45*e* to the next processing time 45*c*, which has been updated in S514 (S522). The next processing time of the ID=0 becomes 160, and the next deadline becomes 240. The next processing time of the ID=1 becomes 200, and the next deadline becomes 225. The next processing time of the ID=2 becomes 125, and the next deadline becomes 250. In the current state of the management table 45, a minimal next deadline is 225 msec of the sensor B, and, among the next processing time before 225 msec, a maximal value is 200 msec of the sensor B. Accordingly, the processor 30 acquires ID=1 as a sensor ID of which the next processing time is set in the RTC trigger register 51 (S524). The processor 30 sets the RTC trigger register 51 to 200 that is the next processing time of the sensor B (S525). When the process of the interrupt handler INTHL5 ends, the process is returned to the application program AP5. The application program AP5 causes the processor 30 to enter the sleep state.

Thereafter, similarly, the processor 30 is woken up only at time 200, time 300, time 375, and time 400, and the data acquisition processes of which the next processing time is before the current time are executed each time.

According to the fifth embodiment, based on the data generation period of the sensor and the data lifetime, the timing for waking up the processor 30 is dynamically changed so as not to allow an occurrence of a data loss. In addition, the sensor data acquisition process is managed by the timer. For this reason, also in a case where a sensor does not have the interrupt request function, the number of times of execution of a transition of the processor 30 between the sleep state and the active state can be decreased. Accordingly, the power consumption of the processor 30 can be reduced. In addition, after the data deadline, the data acquisition process is not executed by the processor 30, and accordingly, there is no loss of the sensed data.

Sixth Embodiment

In a sixth embodiment, similar to the fourth embodiment, a case is considered in which a sensor of which the data lifetime is shorter than the data acquisition interval is present. In addition, similar to the third embodiment, a case is considered in which sensors having the interrupt request function and a sensor not having the interrupt request function are mixed.

Figure 33:
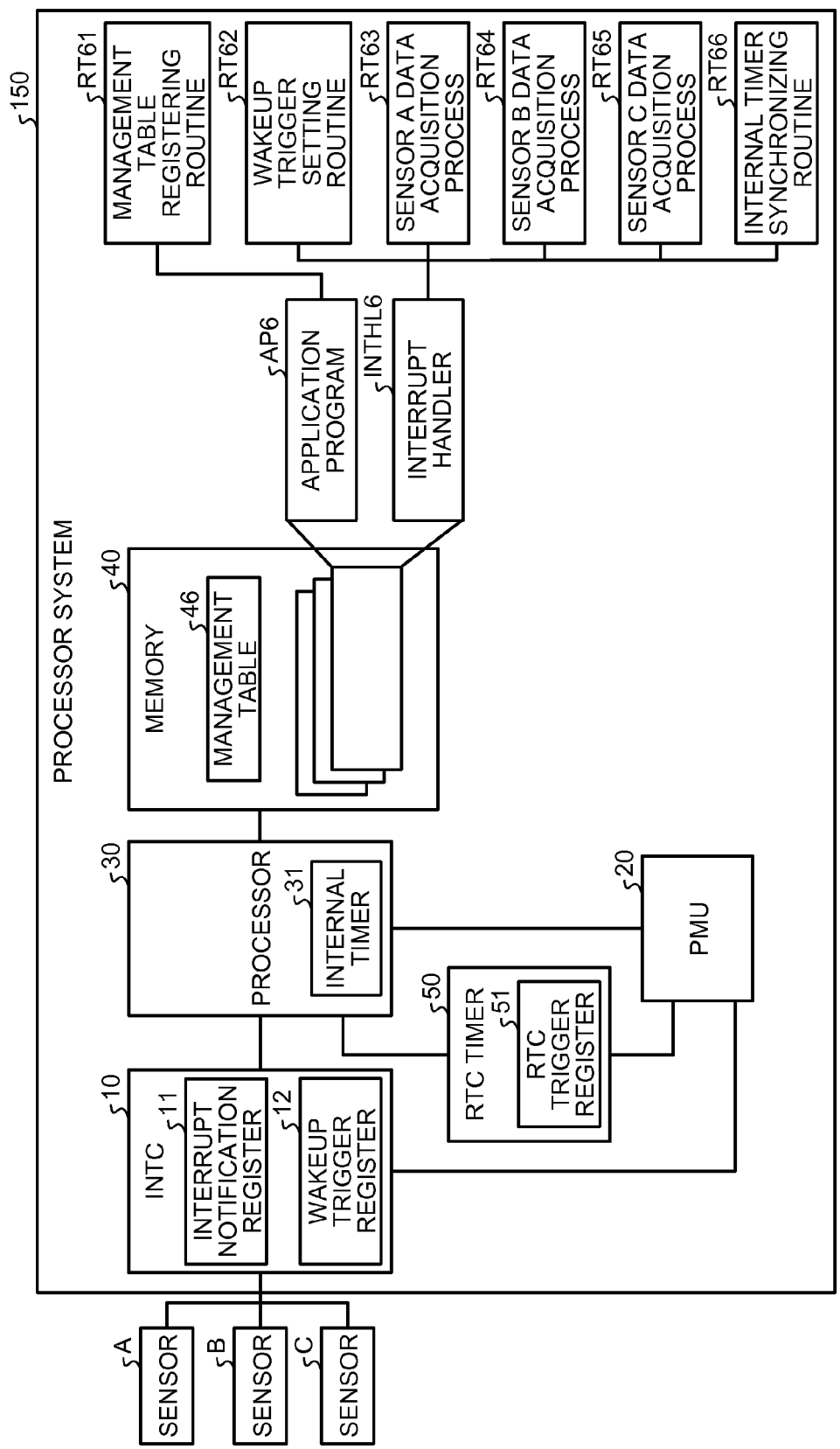
FIG. 33 is a block diagram that illustrates a processor system according to a sixth embodiment.

FIG. 33 is a functional block that illustrates a processor system 150 according to the sixth embodiment. Three sensors A, B, and C are connected to the processor system 150. The sensor A generates sensed data at an interval of 80 msec, and the data lifetime thereof is 80 msec. The sensor B generates sensed data at an interval of 100 msec. The sensor B includes an FIFO therein, and the data lifetime thereof is 25 msec. The sensor C generates sensed data at an interval of 125 msec, and the data lifetime thereof is 125 msec. While the sensors A and C have the interrupt request function, the sensor B does not have the interrupt request function.

The processor system 150 illustrated in FIG. 33 includes an INTC 10 and an RTC timer 50. The functions of the INTC 10 and the RTC timer 50 are the same as those of the third embodiment described above, and duplicate description will not be presented. A processor 30 includes an internal timer 31. A PMU 20 manages the supply of power to the INTC 10, the processor 30, a memory 40, the RTC timer 50, and the like included in the processor system 150. The PMU 20 wakes the processor 30 up according to a request from the INTC 10 or the RTC timer 50.

In the memory 40, a management table 46 and an application program AP6, an interrupt handler INTHL6, a management table registering routine RT61, a wakeup trigger setting routine RT62, a sensor A data acquisition process RT63, a sensor B data acquisition process RT64, a sensor C data acquisition process RT65, and an internal timer synchronizing routine RT66, which are executed by the processor 30, are stored.

Figures 34, 35:
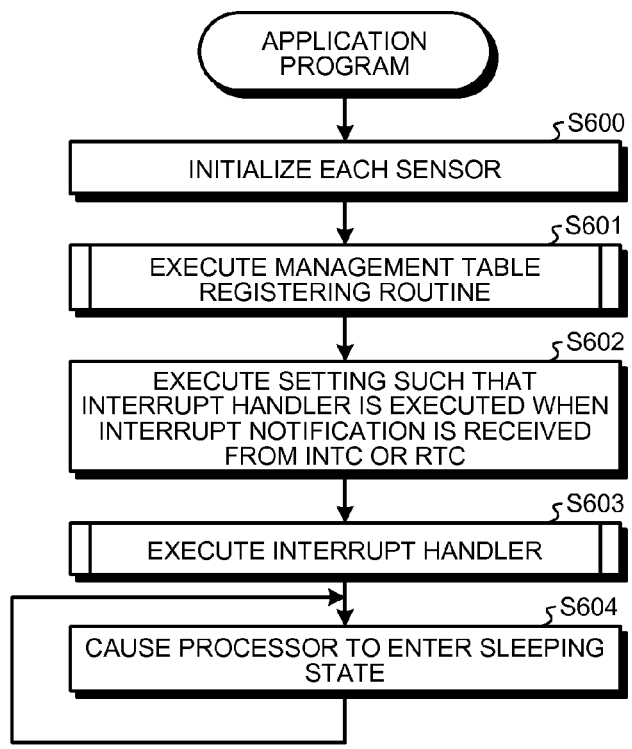
FIG. 34 is a diagram that illustrates a management table according to the sixth embodiment.
FIG. 35 is a flowchart that illustrates the operation sequence of an application program according to the sixth embodiment.

FIG. 34 is a diagram that illustrates the data structure of the management table 46. The management table 46 includes management information having a set of a sensor ID and an entry address 46a of a data acquisition process, a processing interval 46b, a next processing time (next_proc) 46c, a trigger type 46d, a data lifetime (lifetime) 46e, and next deadline (next_deadline) 46f.

Hereinafter, the operation according to the sixth embodiment will be described in detail. FIG. 35 is a flowchart that illustrates the operation sequence of the application program AP6. When the processor system 150 is started to operate, the processor 30 executes the application program AP6. The application program AP6 initializes the sensors A, B, and C (S600).

Figure 36:
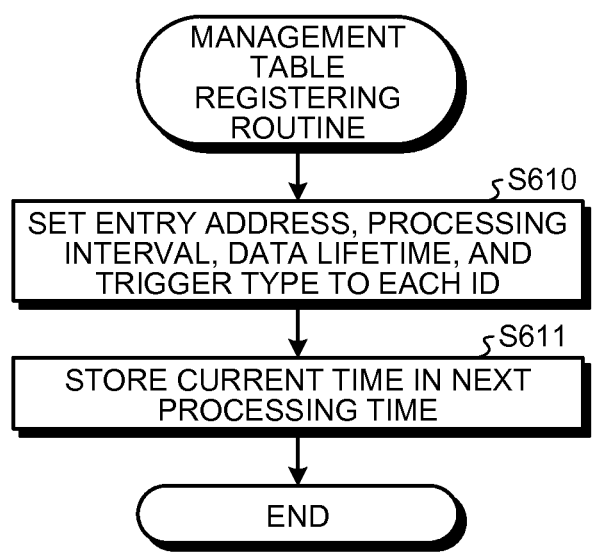
FIG. 36 is a flowchart that illustrates a management table registering routine according to the sixth embodiment.

Next, the processor 30 executes the management table registering routine RT61 (S601). FIG. 36 is a flowchart that illustrates the management table registering routine RT61. First, for each sensor ID, the entry address 46a, the processing interval 46b, the data lifetime 46e, and the trigger type 46d are set (FIG. 36: S610). Next, the processor 30 sets the current time (0) to the next processing time 46c of each sensor ID.

The processor 30 sets an interrupt vector and the like such that the interrupt handler INTHL6 is executed when an interrupt request from the INTC 10 or the RTC timer 50 is received (FIG. 35: S602). Next, the processor 30 executes the interrupt handler INTHL6 (S603). Thereafter, the application program AP6 causes the processor 30 to be in the sleep state (S604).

Figure 37:
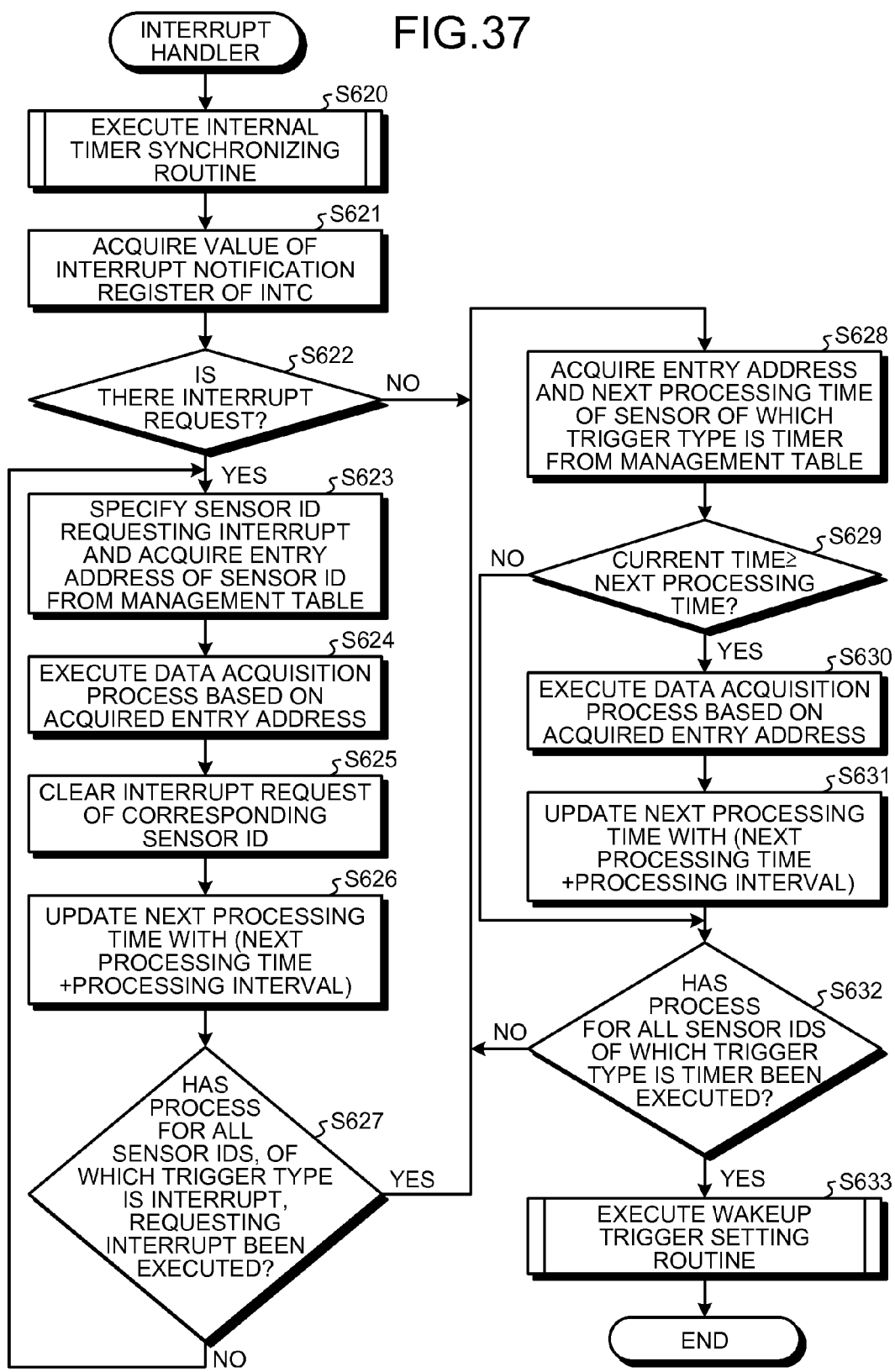
FIG. 37 is a flowchart that illustrates the operation sequence of an interrupt handler according to the sixth embodiment.

FIG. 37 is a flowchart that illustrates the operation sequence of the interrupt handler INTHL6. The interrupt handler INTHL6 executes the internal timer synchronizing routine RT66 (S620). The sequence of the internal timer synchronizing routine RT66 is similar to the sequence illustrated in FIG. 13. In other words, the processor 30 acquires the current time from the RTC timer 50 and sets the acquired current time as the time of the internal timer 31. Next, the interrupt handler INTHL6 acquires the register value of the interrupt notification register 11 (S621). The interrupt handler INTHL6 checks whether or not an interrupt request from any one of the sensors A to C has occurred by referring to the acquired register value (S622). In a case where there is an interrupt request (S622: Yes), the interrupt handler INTHL6 acquires an entry address of the data acquisition process that corresponds to the sensor ID issuing the interrupt request from the management table 46 (S623) and executes the data acquisition process designated by the acquired entry address (S624). Then, the interrupt handler INTHL6 clears the interrupt flag of the corresponding sensor ID from "1" to "0" (S625). Next, the interrupt handler INTHL6 updates the next processing time of the sensor ID with a value acquired by adding the processing interval 46b to the next processing time of the sensor ID having an interrupt request (S626). The interrupt handler INTHL6 determines whether or not the data acquisition process has been executed for all the sensor IDs of the sensors, of which the trigger type is the interrupt, each having an interrupt flag of "1" (S627). In a case where a result of the determination is "No", the same process as that described above is executed for all the sensor IDs, of which the trigger type is the interrupt, each having an interrupt flag of "1".

Next, the interrupt handler INTHL6 acquires the entry address 46a and the next processing time 46c of the sensor ID of which the trigger type is the timer from the management table 46 (S628). Next, the interrupt handler INTHL6 compares the current time acquired from the internal timer 31 with the next processing time 46c of the sensor ID that is acquired in S628 (S629). In a case where the next processing time 46c of the sensor ID is the current time or before the current time (S629: Yes), the interrupt handler INTHL6 executes the data acquisition process designated by the entry address of the sensor ID acquired in S628 (S630). Next, the interrupt handler INTHL6 updates the next processing time of the sensor ID with a value acquired by adding the processing interval 46b to the next processing time of the sensor (S631). The interrupt handler INTHL6 determines whether or not the process for all the sensor IDs of which the trigger type is the timer has ended (S632). In a case where a result of the determination is "No", the process of S628 to S632 is executed for all the sensors of which the trigger type is the timer. Next, the interrupt handler INTHL6 executes the wakeup trigger setting routine RT62 (S633).

Figure 38:
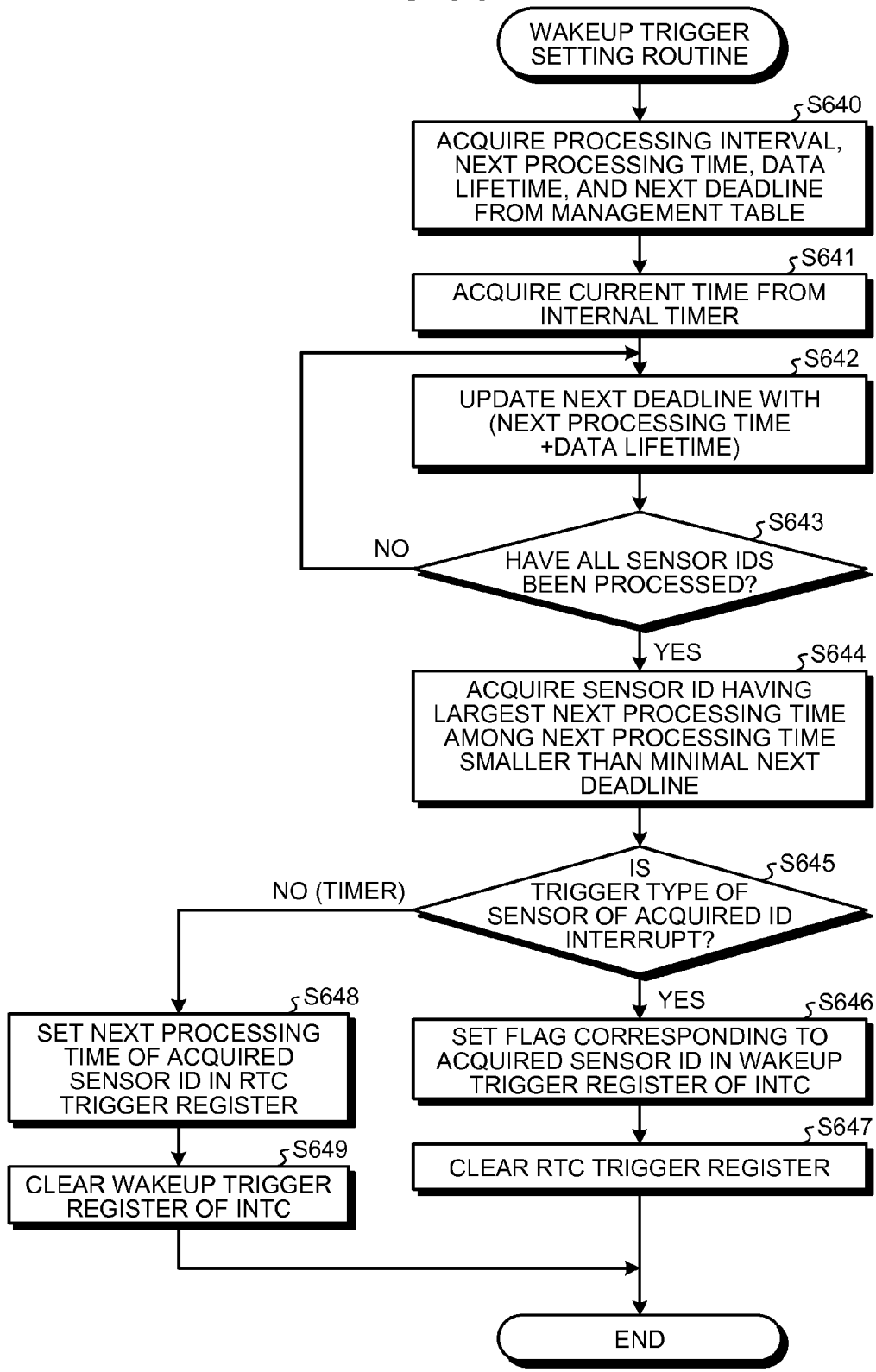
FIG. 38 is a flowchart that illustrates a wakeup trigger setting routine according to the sixth embodiment.

FIG. 38 is a flowchart that illustrates the wakeup trigger setting routine RT62. The processor 30 acquires the processing interval 46b, the next processing time 46c, the data lifetime 46e, and the next deadline 46f from the management table 46 (S640). Next, the processor 30 acquires the current time from the internal timer 31 (S641). Then, the processor 30 executes the following process for each sensor ID. The processor 30 updates the next deadline 46f with a value acquired by adding the data lifetime 46e to the next processing time 46c, which has been updated in S626 or S631 (S642). Such a process is repeatedly executed for all the sensor IDs (S642 and S643). Next, the processor 30 determines a minimum value of the next deadlines of all the sensor IDs and acquires a sensor ID having the largest (latest) next processing time from among the next processing time smaller than the minimum value (S644). Next, the processor 30 determines whether the trigger type of the acquired sensor ID is the interrupt or the timer (S645). In a case where the trigger type is the interrupt, the processor 30 sets the wakeup trigger register 12 such that a processor wakeup request is issued from the INTC 10 to the PMU 20 only when there is an interrupt processing request from the sensor having the acquired ID (S646). In other words, the processor 30 sets the wakeup trigger flag of the acquired sensor ID to "1". In addition, the processor 30 clears the RTC trigger register 51 (S647). On the other hand, in a case where the trigger type is the timer (S645: No), the RTC trigger register 51 is set based on the next processing time of the acquired sensor ID (S648). In addition, the processor 30 clears the wakeup trigger register 12 (S649).

Next, the operation of the processor system 150 will be described in more detail with reference to the timing diagram illustrated in FIG. 24 and the like. After the processor system 150 is started to operate, the application program AP6 is executed. The processor 30 initializes the sensors A, B, and C (FIG. 35: S600). Next, the processor 30 sets the management information of each of the sensors A to C in the management table 46 (S601). For the sensor A, ID=0, entry address=0x1100, interval=80, next_proc=0, lifetime=80, next_deadline=0, and trigger type=int are set. For the sensor B, ID=1, entry address=0x1200, interval=100, next_proc=0, lifetime=25, next_deadline=0, and trigger type=timer are set. For the sensor C, ID=2, entry address=0x1300, interval=125, next_proc=0, lifetime=125, next_deadline=0, and trigger type=int are set. Next, the processor 30 sets the interrupt vector and the like such that the interrupt handler INTHL6 is executed when an interrupt request is received from the INTC 10 or the RTC timer 50 (S602). Then, in order to execute the data acquisition process of a first time, the processor 30 executes the interrupt handler INTHL6 (S603).

At time 0, sensing operations of the sensors A to C are executed, whereby data is generated. The interrupt handler INTHL6 synchronizes the internal timer 31 (FIG. 36: S620). At time 0, the value of the internal timer 31 remains to be "0". Next, the processor 30 acquires the register value of the interrupt notification register 11 (S621). At time 0, since there are interrupt requests from the sensors A and C, the register value is (101). In this case, first, ID=0 is selected. The interrupt handler INTHL6 acquires the entry address 0x1100 of the ID=0 from the management table 46 (S623) and executes the sensor A data acquisition process RT63 stored at the entry address 0x1100 of the memory 40 (S624). Then, the interrupt handler INTHL6 clears the interrupt flag of the ID=0 to "0" (S625). Next, the interrupt handler INTHL6 updates the next processing time with 80 (=the next processing time (0)+the processing interval (80)) (S626). In addition, a similar process is executed by the interrupt handler INTHL6 for the ID=2. In addition, the next processing time of the sensor C is updated with 125 (=0+125).

Next, the interrupt handler INTHL6 compares the current time (0) with the next processing time (0) for the sensor B of which the trigger type is the timer (S629). Here, since the current time (0) is the next processing time (0) or after the next processing time, the interrupt handler INTHL6, similarly, executes the sensor B data acquisition process RT64 (S630). In addition, the interrupt handler INTHL6 updates the next processing time of the sensor B with 100 (=0+100) (S631).

Next, the processor 30 executes the wakeup trigger setting routine RT62 (S633). The processor 30 acquires the processing interval 46b, the next processing time 46c, the data lifetime 46e, and the next deadline 46f from the management table 46 (S640). Next, the processor 30 acquires the current time 0 from the internal timer 31 (S641). The processor 30 updates the next deadline of the ID=0 with "the next processing time (80) updated in S626+the data lifetime (80)"=160 (S642). Similarly, the processor 30 updates the next deadline of the ID=1 with 125 (=100+25) and updates the next deadline of the ID=2 with 250 (=125+125). In the current state of the management table 46, a minimal next deadline is 125 msec of the sensor B (ID=1). In addition, among the next processing time before 125 msec, a maximal next processing time is 100 msec of the sensor B. The processor 30 acquires ID=1 as a sensor ID set in the wakeup trigger register 12 (S645). Since the trigger type of the sensor B (ID=1) is the timer, the processor 30 sets the next processing time (=100) of the ID=1 in the RTC trigger register 51 (S648). In addition, the processor 30 clears the wakeup trigger register 12 (S649). When the process of the interrupt handler INTHL6 ends, the process is returned to the application program AP6. The application program AP6 causes the processor 30 to enter the sleep state (FIG. 35: S604).

Next, at time 80, an interrupt request is issued from the sensor A, and the register value of the interrupt notification register 11 becomes (100). At this time, the register value of the wakeup trigger register 12 is (010). For this reason, the INTC 10 does not issue a processor wakeup request to the PMU 20. Accordingly, the processor 30 remains to be in the sleep state and does not execute the data acquisition process.

Next, at time 100, the timer value of the RTC timer 50 coincides with the register value (=100) of the RTC trigger register 51. Accordingly, a processor wakeup request is issued from the RTC timer 50 to the PMU 20, and an interrupt request is notified from the RTC timer 50 to the processor 30. Thus, the processor 30 enters the active state and executes the interrupt handler INTHL6.

The interrupt handler INTHL6 synchronizes the internal timer 31 to the current time=100 of the RTC timer 50 (S620). The interrupt handler INTHL6 acquires the register value (100) of the interrupt notification register 11 (S621). Based on this register value (100), the processor 30 executes the sensor A data acquisition process RT63 (S623 and S624). Then, the interrupt handler INTHL6 clears the interrupt flag of the ID=0 to "0" (S625). In addition, the interrupt handler INTHL6 updates the next processing time of the ID=0 with 160 (=80+80) (S626).

Next, the interrupt handler INTHL6 acquires the next processing time (100) of the sensor B (ID=1) from the management table 46 (S628) and compares the acquired next processing time (100) with the current time (100) (S629). At this time, since the current time (100) is the next processing time (100), the processor 30 executes the sensor B data acquisition process RT64 (S630). Then, the interrupt handler INTHL6 updates the next processing time of the ID=1 with 200 (=100+100) (S631). Next, the interrupt handler INTHL6 calls the wakeup trigger setting routine RT62.

The processor 30 acquires the processing interval 46b, the next processing time 46c, the data lifetime 46e, and the next deadline 46f from the management table 46 (S640). Next, the processor 30 acquires the current time (100) from the internal timer 31 (S641). Then, the processor 30 executes the following process for each sensor ID. The processor 30 updates the next deadline 46f with a value acquired by adding the data lifetime 46e to the latest next processing time 46c, which is registered in the management table 46, (S642). The next processing time of the ID=0 becomes 160, and the next deadline thereof becomes 240 (=160+80). In addition, the next processing time of the ID=1 becomes 200, and the next deadline thereof becomes 225 (=200+25). The next processing time of the ID=2 becomes 125, and the next deadline thereof becomes 250 (=125+125). In the current state of the management table 46, a minimal next deadline is 225 msec of the sensor B, and, a maximum value of the next processing time before 225 msec is 200 msec of the sensor B. Accordingly, the processor 30 acquires the ID=1 as the sensor ID (S644). The processor 30 sets 200 that is the next processing time of the sensor B in the RTC trigger register 51 (S648). In addition, the processor 30 clears the wakeup trigger register 12 (S649). When the process of the interrupt handler INTHL6 ends, the process is returned to the application program AP6. The application program AP6 causes the processor 30 to enter the sleep state.

Thereafter, similarly, the processor 30 is woken up only at time 200, time 300, time 375, and time 400, and, at each time, for a sensor of which the trigger type is the interrupt, the data acquisition process is executed based on the value of the interrupt notification register 11, and, for a sensor of which the trigger type is the timer, the data acquisition process is executed based on the value of the next processing time.

According to the sixth embodiment, based on the data generation period of the sensor and the data lifetime, the timing for waking up the processor 30 is dynamically changed so as not to allow an occurrence of a data loss. In addition, the sensor data acquisition process is managed by the interrupt control process and the timer. For this reason, also in a case where sensors having the interrupt request function and sensors not having the interrupt request function are mixed, the number of times of execution of a transition of the processor 30 between the sleep state and the active state can be decreased. Accordingly, the power consumption of the processor 30 can be reduced. In addition, since any data acquisition process is not executed by the processor 30 after the data deadline, there is no loss of the sensed data.

Seventh Embodiment

Figure 39:
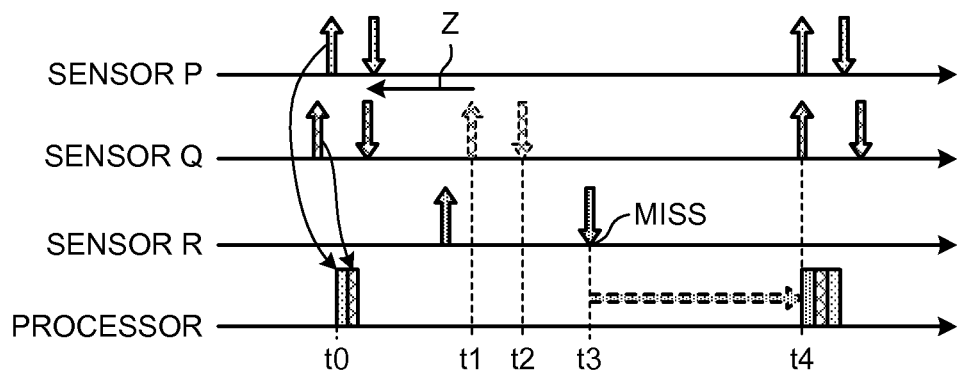
FIG. 39 is a timing diagram that illustrates the process according to the fourth embodiment in a case where a jitter is present.

In a case where a jitter is present at the data generation time of a sensor, there is a possibility that a loss of data occurs due to the jitter. FIG. 39 illustrates timing diagrams of sensors P, Q, and R and a processor. The sensors P, Q, and R have the interrupt request function. In FIG. 39, each upward arrow represents time at which sensor data is generated. In addition, each downward arrow represents a deadline of sensor data. A period from an upward arrow to a downward arrow represents a data lifetime. It is assumed that a jitter occurs in the sensor Q, and the data generation time of the sensor Q, as denoted by an arrow Z, deviates from normal time denoted by a broken line to a prior time point denoted by a solid line.

A case will be described in which data of the sensors P, Q, and R illustrated in FIG. 39 is acquired under the control of the fourth embodiment. At a time point of time t0, the processor is woken up by using the sensor P as a wakeup trigger. Here, "by using the sensor P as a wakeup trigger" corresponds to a state in which both interrupt flag and wakeup trigger flag corresponding to the sensor P are "1"s. At the time t0, the processor acquires the data of the sensors P and Q. Next, in order to set the wakeup trigger flag for the next wakeup, the processor executes the process of S436 represented in FIG. 28. At the time point t0, a minimal next deadline is time t2, and final next processing time among the next processing time before the next deadline t2 is time t1. Accordingly, the processor sets the wakeup trigger flag of the sensor Q to "1". However, at the time t1, since an interrupt request is not issued from the sensor Q due to the jitter, the processor is not woken up. The processor is woken up at time t4 that is a further next period of the sensor Q by using the sensor Q as a wakeup trigger. At the time t4, the processor acquires the data of the sensors PQR. However, the data lifetime of the sensor R ends at time t3. As above, the sensor R acquisition process is delayed due to the jitter, and a loss of the data of the sensor R occurs.

Figure 40:
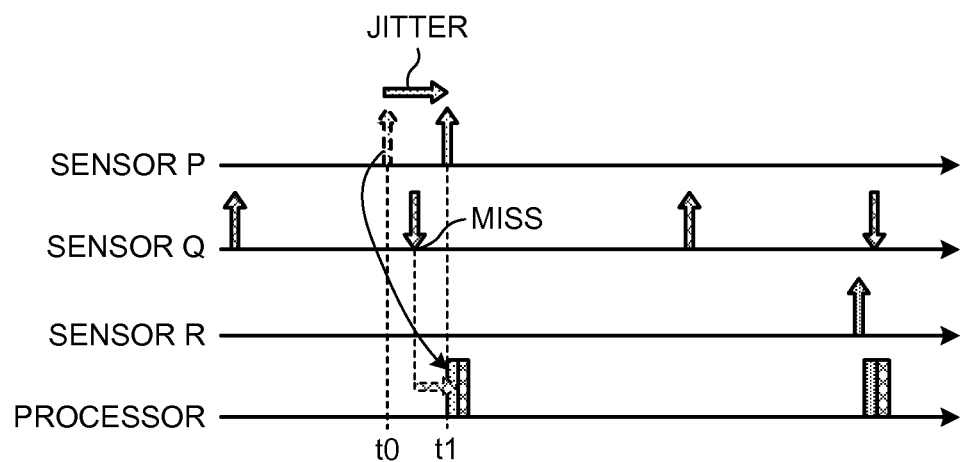
FIG. 40 is a timing diagram that illustrates a seventh embodiment.

The seventh embodiment can be applied to the control of the fourth embodiment. According to the seventh embodiment, the processing interval 44b registered in the management table 44 (see FIG. 23) is registered as a value having a margin value Mz1 that is the maximal value of the jitter being taken into account. In other words, a value acquired by subtracting the margin value Mz1 from the processing interval is set as the processing interval 44b. The margin value Mz1 is a maximal value of the jitter in the direction of the advancement of time. By setting as such, the data generation time of each sensor necessarily deviates to the rear side, and accordingly, the loss of data according to the deviation of the data generation time to the front side as illustrated in FIG. 39 does not occur. However, a case where a loss of data occurs also when such setting is executed is illustrated in FIG. 40. In other words, the case is a case where a jitter occurs at the data generation time of the sensor determined as a wakeup trigger. In the case illustrated in FIG. 40, the sensor P is selected as the wakeup trigger. The data generation time of the sensor P is delayed from time t0 to time t1. For this reason, the processor 30 is woken up at the time t1. Between the time t0 and the time t1, the lifetime of the data of the sensor Q ends. As above, in the case illustrated in FIG. 40, the acquisition process of the sensor Q is delayed due to the jitter, and a loss of the data of the sensor Q occurs.

As a solution for a case where the data generation time of the sensor selected as the wakeup trigger is shifted, according to the seventh embodiment, the data lifetime is used as a value having the margin value Mz2 that is the maximal value of the jitter being taken into account in the calculation. In other words, a value acquired by subtracting the margin value Mz2 from the data lifetime is used as the data lifetime in the calculation. The margin value Mz2 is a maximal value of the jitter in the direction of the delay of time. Here, the margin values Mz1 and Mz2 may be the same value. In addition, in consideration of the accumulation of the jitter, according to the seventh embodiment, for the sensor selected as the wakeup trigger, the method of calculating the next processing time at the time of wakeup is changed. In other words, instead of adding the processing interval to the next processing time of the previous time, by adding the processing interval to the current time at the time of wakeup, the next processing time is acquired. In a case where a jitter occurs, by correcting the next processing time before the update to actual wakeup time at the wakeup of the processor and adding the processing interval to the corrected value, the accumulation of the jitter is prevented.

Figure 41:
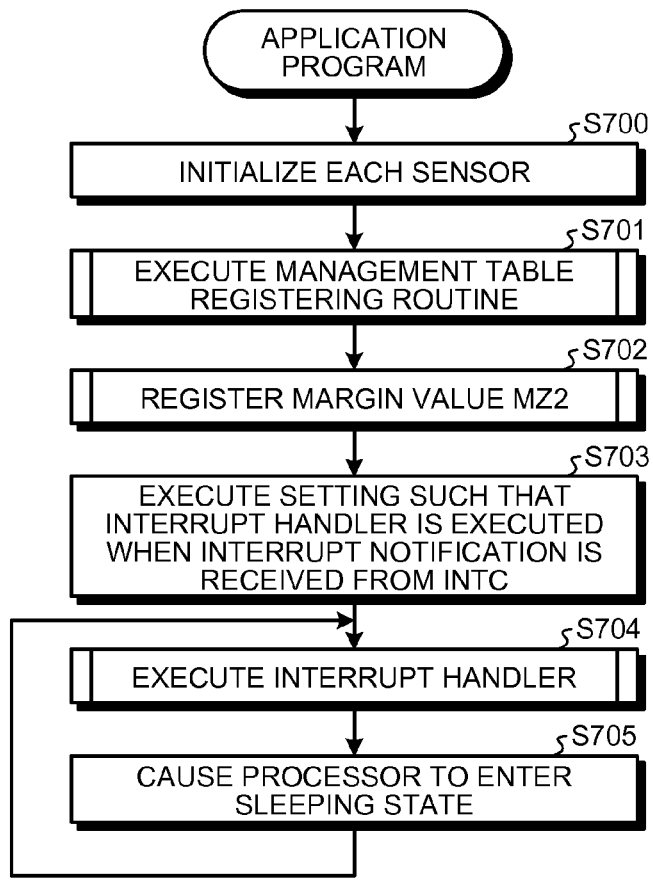
FIG. 41 is a flowchart that illustrates the operation sequence of an application program according to the seventh embodiment.

FIG. 41 is a flowchart that illustrates the operation sequence of an application program according to the seventh embodiment. Only a difference between the cases illustrated in FIGS. 41 and 25 is that S702 is added to the case illustrated in FIG. 41, and thus, duplicate description thereof will not be presented. In S702, the margin value Mz2 is set and registered.

Figure 42:
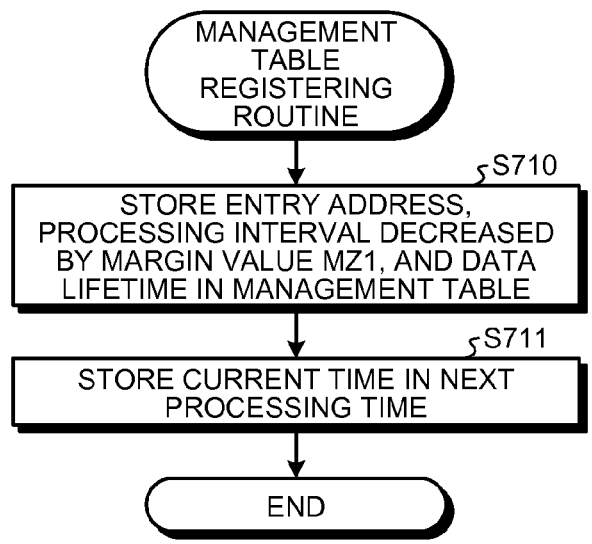
FIG. 42 is a flowchart that illustrates a management table registering routine according to the seventh embodiment.

FIG. 42 is a flowchart that illustrates a management table registering routine according to the seventh embodiment. In the seventh embodiment, a value acquired by subtracting the margin value Mz1 from the processing interval is set as the processing interval 44b (S710). The other sequences are similar to those illustrated in FIG. 26, and thus, description thereof will not be presented. In the seventh embodiment, the processing sequence of the interrupt handler is the same as that illustrated in FIG. 27, and thus, duplicate description thereof will not be presented.

Figure 43:
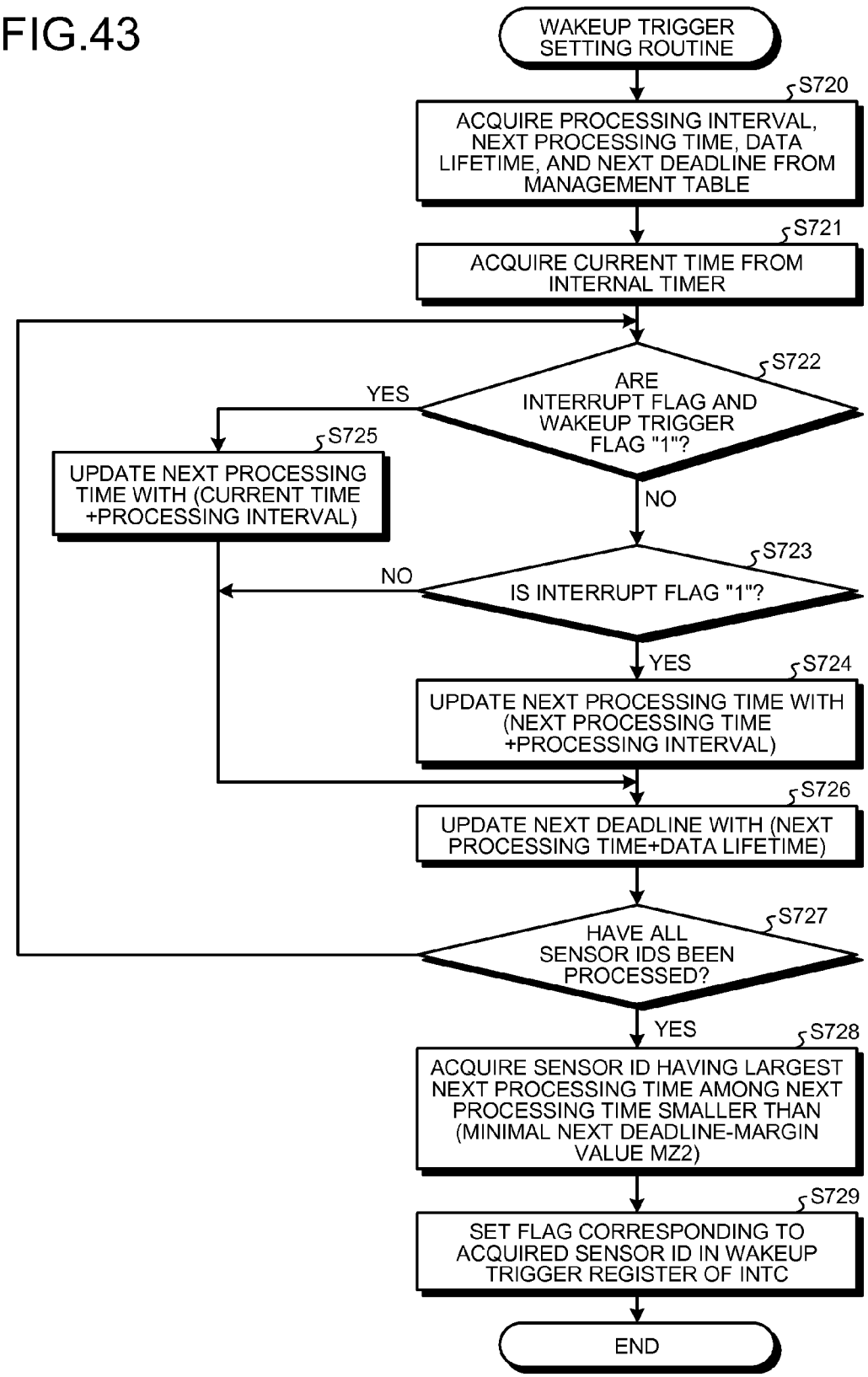
FIG. 43 is a flowchart that illustrates a wakeup trigger setting routine according to the seventh embodiment.

FIG. 43 is a flowchart that illustrates a wakeup trigger setting routine according to the seventh embodiment. Differences between the cases illustrated in FIGS. 43 and 28 are S722, S723, S725, and S728 represented in FIG. 43, and thus, duplicate description thereof will not be presented. The process of S722 to S727 is executed for each sensor ID. The processor determines whether or not both the interrupt flag and the wakeup trigger flag have "1" (S722). In a case where a result of the determination is "Yes", an interrupt request is generated from the sensor of which the wakeup trigger flag is set to "1", and accordingly, the processor updates the next processing time with (the current time+the processing interval) (S725). On the other hand, in a case where the result of the determination acquired in S722 is "No", it is determined whether or not an interrupt request is generated from this sensor ID by referring to the register value of the interrupt notification register 11 (S723). In a case where a result of the determination acquired in S723 is "Yes", the processor updates the next processing time with (the next processing time+the processing interval) (S724). While a sensor issuing an interrupt request is identified by comparing the current time with the next processing time in S432 represented in FIG. 28, in the seventh embodiment, data acquisition control is executed in consideration of the jitter, and accordingly, the process of S432 represented in FIG. 28 is not employed. In S728 represented in FIG. 43, the processor acquires a sensor ID having the largest next processing time among the next processing time that is smaller than a value acquired by subtracting the margin value Mz2 from the minimal next deadline. Then, the processor sets the wakeup trigger flag of the acquired sensor ID to "1" (S729).

Figure 44:
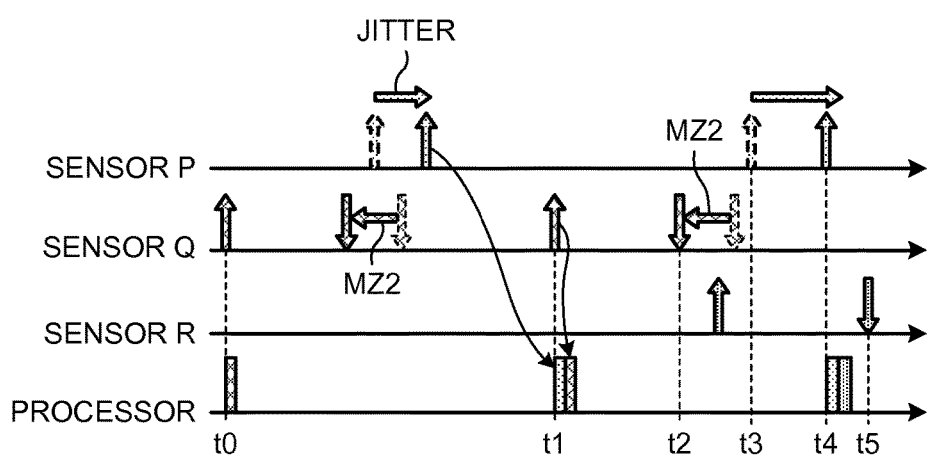
FIG. 44 is a timing diagram that illustrates the seventh embodiment.

FIG. 44 illustrates a timing diagram of the sensors P, Q, and R and the processor according to the seventh embodiment. Here, it is assumed that a jitter occurs in the sensor P. When the processor transits to the sleep state before the time t0, the sensor Q is selected as a sensor having the minimal next deadline. The reason for this is that the next deadline of the sensor Q is before the next deadline t3 of the sensor P and the next deadline t5 of the sensor R. While the sensor P is selected as the wakeup trigger in the case illustrated in FIG. 40, in the case illustrated in FIG. 44, the margin value Mz2 is subtracted from the next deadline of the sensor Q, and accordingly, the sensor Q is selected as the wakeup trigger. Accordingly, at the time t0, the processor is woken up by using the sensor Q as the wakeup trigger and acquires the data of the sensor Q. As above, a loss of the data of the sensor Q, as in the case illustrated in FIG. 40, does not occur. In addition, since the sensor Q is the wakeup trigger sensor, the next processing time is updated by using the current time in the process of S725. However, a jitter does not occur in the sensor Q, and accordingly, a result of the update has no difference from that of the update process of S724. Next, in order to set the wakeup trigger flag for the next wakeup, the processor executes the process of S728. At the time point t0, the minimal next deadline is time t2, and the final next processing time among the next processing time before the next deadline t2 is the time t1. Accordingly, the processor sets the wakeup trigger flag of the sensor Q to "1".

At the time t1, the processor is woken up by using the sensor Q as a wakeup trigger. At the time t1, the processor acquires the data of the sensors P and Q. Since the sensor Q is the wakeup trigger sensor, the next processing time is updated by using the current time in the process of S725. However, since a jitter does not occur in the sensor Q, and a result of the update has no difference from that of the update process of S724. Next, in order to set the wakeup trigger flag for the next wakeup, the processor executes the process of S728. At the time point t1, the minimal next deadline is time t5, and the final next processing time among the next processing time before the next deadline t5 is time t3. Accordingly, the processor sets the wakeup trigger flag of the sensor P to "1".

The occurrence time of the interrupt request from the sensor P deviates from the time t3 to time t4 due to a jitter. For this reason, when it is the time t4, the processor is woken up by using the sensor P as a wakeup trigger and acquires the data of the sensors P and R. Since the sensor P is the wakeup trigger sensor, the next processing time is updated in the process of S725. In this update process, the next processing time t3 before the update is corrected to the current time t4 that is actual wakeup time, and the processing interval of the sensor P is added to the correction time t4.

According to the seventh embodiment, also in a case where a jitter occurs in the data generation period of the sensor, the number of times of execution of a transition of the processor between the sleep state and the active state can be decreased without any loss of the data, and the power consumption of the processor can be reduced.

Eighth Embodiment

According to an eighth embodiment, when the interrupt handlers INTHL1 to INTHL6 call the data acquisition processes RT13 to RT15 and RT63 to RT65, by referring to the next processing time before the update in the data acquisition processes RT13 to RT15 and RT63 to RT65, the data acquisition processes RT13 to RT15 and RT63 to RT65 can acquire the generation time of the sensor data. For this reason, the data generation time of each sensor can be presented to the user.

For example, in the timing diagram illustrated in FIG. 3B, for the sensor A, the data generation time is time 0, time 80, time 160, time 240, time 320, and time 400, values stored in the next processing time before the execution of the data acquisition process are 0, 80, 160, 240, 320, and 400, and the data generation time and the next processing time coincide with each other.

For the sensor B, the data generation time is time 0, time 100, time 200, time 300, and time 400, and time at which the data acquisition process is executed is time 0, time 160, time 240, time 320, and time 400, which are different from the data generation time. In addition, values stored in the next processing time before the execution of the data acquisition process are 0, 100, 200, 300, and 400, which coincide with the data generation time.

For the sensor C, the data generation time is time 0, time 125, time 250, and time 375, and time at which the data acquisition process is executed is time 0, time 160, time 320, and time 400, which are different from the data generation time. In addition, values stored in the next processing time before the execution of the data acquisition process are 0, 125, 250, and 375, which coincide with the data generation time.

As above, the data acquisition time of each sensor coincides with the values stored in the next processing time of each sensor before the execution of the data acquisition process. For this reason, according to the eighth embodiment, at the time of calling the data acquisition processes RT13 to RT15 and RT63 to RT65, the interrupt handlers INTHL1 to INTHL6 allows the registered next processing time of each sensor to be referred by or be provided for the data acquisition processes RT13 to RT15 and RT63 to RT65. Accordingly, the data acquisition processes RT13 to RT15 and RT63 to RT65 can acquire the actual data generation time of each sensor.

According to the eighth embodiment, each of the data acquisition processes RT13 to RT15 and RT63 to RT65 can acquire the actual data generation time of each sensor. Accordingly, the actual data generation time of each sensor can be allowed to be acquired by the application program, and the actual data generation time of each sensor can be provided for the user.

Ninth Embodiment

In a ninth embodiment, a case is considered in which the processor 30 supports a plurality of stages of the sleep state. In addition, as in the fourth to sixth embodiments, a case is considered in which the wakeup intervals of the processor 30 are different between the plurality of stages. For example, a sleep state M1 in which a transition time between the active state and the sleep state is short, but the power consumption is high and a sleep state M2 in which the transition time is longer than that of the sleep state M1, but the power consumption is lower than that of the sleep state M1 are supported.

When the processor 30 is caused to be in the sleep state, the application program determines one of the sleep states M1 and M2 for the transition based on a required time Tk until the next wakeup from time at which a transition to the sleep state is made. In a case where the required time Tk is shorter than a threshold Ct, the application program selects the sleep state M1 having a shorter transition time. On the other hand, in a case where the required time Tk is the threshold Ct or more, the application program selects the sleep state M2 having low power consumption.

In the fourth to sixth embodiments, the required time Tk is calculated by acquiring the next processing time 44c, 45c, and 46c corresponding to the sensor ID acquired in Steps S436, S524, and S644 and calculating a time from the current time to the acquired next processing time.

According to the ninth embodiment, the required time Tk from the time at which a transition to the sleep state is made to the next wakeup is calculated, and the sleep state is selected based on the time Tk. Accordingly, the power consumption is reduced, and the state transition of the processor can be efficiently executed. In addition, it may be configured such that two or more threshold values are set, and switching among three or more sleep states is executed.

Tenth Embodiment

In the first to ninth embodiments, while the wakeup trigger setting routine is realized by software, the wakeup trigger setting routine may be realized by hardware. For example, in the case of the wakeup trigger setting routine illustrated in FIG. 6, a plurality of registers storing the processing interval of each sensor and a comparator calculating a minimum value of the register values of the plurality of registers are included, and the wakeup trigger register 12 is set based on an output of the comparator.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sensor data collecting device that is connectable to a plurality of sensors having different data generation periods, the sensor data collecting device comprising:
   a controller that has a first state and a second state and acquires data of one or a plurality of the sensors in the second state; and
   a first circuit that includes a timer and a power management unit, the timer including a first register, the first register storing first time information of a first sensor, the first time information being next data generation time, the first sensor having a minimal data generation period among the plurality of the sensors, wherein
   when current time coincides with the first time information stored in the first register, the timer generates a first signal for the power management unit, and
   the power management unit causes the controller to transit from the first state to the second state by using the first signal as a trigger.

2. The sensor data collecting device according to claim 1, wherein the controller includes a management table managing the data generation period of each of the sensors and the first time information of each of the sensors, and
   the controller acquires data of one or a plurality of sensors for which the current time is equal to or more than the first time information when transiting to the second state.

3. The sensor data collecting device according to claim 2, wherein the controller updates the first time information of the sensor of which the data is acquired, updates the first register based on the first time information of the first sensor, and transits to the first state.

4. The sensor data collecting device according to claim 1, wherein the controller presents the data generation time of each of the sensors to a user by using the first time information.

5. The sensor data collecting device according to claim 1, wherein the controller has the first state that is configured by a plurality of sleep states, and
the controller calculates a first time interval from startup of this time to startup of the next time and transits to one of the sleep state of the plurality of sleep states based on the calculated first time interval.

6. A sensor data collecting device that is connectable to a plurality of sensors having a plurality of different data generation periods, the sensor data collecting device comprising:
a controller that has a first state and a second state and acquires data of one or a plurality of the sensors in the second state; and
a first circuit that includes an interrupt controller and a power management unit, the interrupt controller including a first register and a second register, the first register storing first information representing presence or nopresence of an interrupt request from the plurality of the sensors, the second register storing second information, wherein
the controller calculates first time information that is next data generation time based on the data generation period for each of the sensors, calculates second time information by adding a data lifetime to the first time information for each of the sensors, and sets the second information into the second register, the second information including information that identifies a first sensor, the first sensor having the largest first time information among one or a plurality of the first time information that is smaller than the minimal second time information among the sensors,
the interrupt controller generates a first signal for the power management unit when the interrupt request is issued from the first sensor based on the first and second registers, and
the power management unit causes the controller to transit from the first state to the second state by using the first signal as a trigger.

7. The sensor data collecting device according to claim 6, wherein the controller includes a management table managing the data generation period, the first time information, the data lifetime, and the second time information of each of the sensors, and
the controller, when transiting to the second state, acquires data of one or a plurality of sensors issuing the interrupt requests based on the first information stored in the first register, clears the first register, updates the first and second time information of the sensor issuing the interrupt requests, specifies the first sensor based on the management table after the update, stores the second information into the second register, and transits to the first state.

8. The sensor data collecting device according to claim 7, wherein a value acquired by subtracting a first margin value from the data generation period of each of the sensors is set as the data generation period, and
the controller, when transiting to the second state,
acquires data of one or a plurality of sensors issuing the interrupt requests based on the first information stored in the first register, clears the first register,
updates, based on the current time and the data generation period, the first time information of the sensor identified as the first sensor by the second register among the sensors issuing the interrupt requests,
updates, based on the first time information of the previous time and the data generation period, the first time information of the sensor not identified as the first sensor by the second register among the sensors generating the interrupt requests, and
calculates the second time information of each of the sensors by adding the data lifetime of each of the sensors to the first time information after the update of each of the sensors, specifies a fourth sensor having the largest first time information among one or a plurality of the first time information that is smaller than a value acquired by subtracting a second margin value from minimal second time information among the second time information of each of the sensors, and sets information identifying the fourth sensor into the second register.

9. The sensor data collecting device according to claim 6, wherein the controller presents the data generation time of each of the sensors to a user by using the first time information.

10. The sensor data collecting device according to claim 6,
wherein the controller has the first state that is configured by a plurality of sleep states, and
the controller calculates a first time interval from startup of this time to startup of the next time and transits to one of the sleep state of the plurality of sleep states based on the calculated first time interval.

11. A sensor data collecting device that is connectable to a plurality of sensors having a plurality of different data generation periods, the sensor data collecting device comprising:
a controller that has a first state and a second state and acquires data of one or a plurality of the sensors in the second state; and
a first circuit that includes a timer and a power management unit, the timer including a first register, the first register storing first information, wherein
the controller calculates first time information that is next data generation time based on the data generation period for each of the sensors, calculates second time information by adding a data lifetime to the first time information for each of the sensors, and sets the first information into the first register, the first information including the first time information of a first sensor, the first sensor having the largest first time information among one or a plurality of the first time information that is smaller than the minimal second time information among the sensors,
when current time coincides with the first information stored in the first register, the timer generates a first signal for the power management unit, and
the power management unit causes the controller to transit from the first state to the second state by using the first signal as a trigger.

12. The sensor data collecting device according to claim 11,
wherein the controller includes a management table managing the data generation period, the first time information, the data lifetime, and the second time information of each of the sensors, and
the controller, when transiting to the second state,
acquires data of one or a plurality of the sensors for which the current time is equal to or more than the first time information based on the management table, updates the first time information of the sensor of which the data is acquired, updates the second time information of each of the sensors, specifies the first sensor based on the management table after the update, stores the first information into the first register, and transits to the first state.

13. The sensor data collecting device according to claim 11, wherein the controller presents the data generation time of each of the sensors to a user by using the first time information.

14. The sensor data collecting device according to claim 11,
wherein the controller has the first state that is configured by a plurality of sleep states, and
the controller calculates a first time interval from startup of this time to startup of the next time and transits to one of the sleep state of the plurality of sleep states based on the calculated first time interval.

15. A sensor data collecting device that is connectable to a plurality of sensors having a plurality of different data generation periods, the sensor data collecting device comprising:
a controller that has a first state and a second state and acquires data of one or a plurality of the sensors in the second state; and
a first circuit that includes an interrupt controller, a timer, and a power management unit, the interrupt controller including a first register and a second register, the first register storing first information representing presence or no-presence of an interrupt request from the plurality of the sensors, the second register storing second information, the timer including a third register, the third register storing third information, wherein
the controller calculates first time information that is next data generation time based on the data generation period for each of the sensors, calculates second time information by adding a data lifetime to the first time information for each of the sensors, sets the second information into the second register and sets the third information into the third register, the second information including information that identifies a first sensor, the first sensor having the largest first time information among one or a plurality of the first time information that is smaller than the minimal second time information among the sensors, the third information including the first time information of the first sensor, the interrupt controller generates a first signal for the power management unit when the interrupt request is issued from the first sensor based on the first and second registers,
the timer generates a second signal for the power management unit when current time coincides with the third information stored in the third register
the power management unit causes the controller to transit from the first state to the second state by using the first signal or the second signal as a trigger.

16. The sensor data collecting device according to claim 8,
wherein the controller includes a management table managing the data generation period, the first time information, the data lifetime, the second time information, and a trigger type of each of the sensors, the trigger type representing presence or no-presence of an interrupt request function, and
the controller, when transiting to the second state,
acquires data of one or a plurality of second sensors issuing the interrupt requests based on the first information stored in the first register, clears the first register, updates the first time information of the second sensor,
acquires data of one or a plurality of third sensors for which the current time is equal to or more than the first time information among the sensors having the trigger type representing no-presence of the interrupt request function, updates the first time information of the third sensor,
updates the second time information of each of the sensors, specifies the first sensor based on the management table after the update, updates one of the second register and the third register according to the trigger type of the first sensor, and
transits to the first state.

17. The sensor data collecting device according to claim 15, wherein the controller presents the data generation time of each of the sensors to a user by using the first time information.

18. The sensor data collecting device according to claim 15,
wherein the controller has the first state that is configured by a plurality of sleep states, and
the controller calculates a first time interval from startup of this time to startup of the next time and transits to one of the sleep state of the plurality of sleep states based on the calculated first time interval.

* * * * *